United States Patent
Otsuki et al.

(10) Patent No.: US 7,828,016 B2
(45) Date of Patent: *Nov. 9, 2010

(54) GAS PROCESSING APPARATUS, GAS PROCESSING METHOD AND INTEGRATED VALVE UNIT FOR GAS PROCESSING APPARATUS

(75) Inventors: Hayashi Otsuki, Nirasaki (JP); Yutaka Miura, Nirasaki (JP)

(73) Assignee: Tokyo Electron Limited, Tokyo-to (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/081,687

(22) Filed: Apr. 18, 2008

(65) Prior Publication Data

US 2008/0282977 A1  Nov. 20, 2008

Related U.S. Application Data

(62) Division of application No. 10/979,094, filed on Nov. 2, 2004, now abandoned, which is a division of application No. 10/437,396, filed on May 14, 2003, now Pat. No. 6,817,381, which is a division of application No. 09/644,647, filed on Aug. 24, 2000, now abandoned.

(30) Foreign Application Priority Data

Aug. 24, 1999  (JP)  ............................. 1999-236872

(51) Int. Cl.
 *F16K 11/10* (2006.01)
(52) U.S. Cl. .................................... 137/884
(58) Field of Classification Search ............. 137/269, 137/270, 271, 597, 884
 See application file for complete search history.

(56) References Cited

U.S. PATENT DOCUMENTS 3,348,984 A   10/1967  Pammer ........................ 117/93
3,829,382 A   8/1974  Tucker ................... 252/62.3 R
4,169,486 A   10/1979  Otteman et al. ............. 137/240

(Continued)

FOREIGN PATENT DOCUMENTS

EP    0863227    9/1998

(Continued)

OTHER PUBLICATIONS

Japanese Office Action mailed Feb. 3, 2009 for a corresponding application (JP 201357/1999) with partial English translation (3 pages each).

(Continued)

*Primary Examiner*—John Fox
(74) *Attorney, Agent, or Firm*—Smith, Gambrell & Russell, LLP

(57) ABSTRACT

A process gas line (255) for carrying $WF_6$ gas for nucleation, a process gas line (259) for carrying $WF_6$ gas for film deposition after nucleation are joined at a single joint (280) to a carrier gas line (256). A gas line (270) is connected to the joint (280) to carry a mixed gas of the carrier gas and $WF_6$ gas to a processing chamber defined by a processing vessel. Sections of the carrier gas line (256) and the gas line (270) extending on the opposite sides of the joint (280) extend along a straight line, and the process gas lines (255, 259) are perpendicular to the gas line (270).

10 Claims, 27 Drawing Sheets

U.S. PATENT DOCUMENTS

| | | | |
|---|---|---|---|
| 4,215,721 A | 8/1980 | Hetherington et al. | 137/606 |
| 4,615,298 A * | 10/1986 | Yamazaki | 118/723 R |
| 4,659,401 A | 4/1987 | Reif et al. | 117/92 |
| 4,977,916 A * | 12/1990 | Ohmi et al. | 137/8 |
| 5,260,236 A | 11/1993 | Petro et al. | 438/786 |
| 5,460,204 A | 10/1995 | Rossi | 137/884 |
| 5,469,885 A | 11/1995 | Nishimura | 137/565.23 |
| 5,531,183 A | 7/1996 | Sivaramakrishnam et al. | 438/784 |
| 5,605,179 A | 2/1997 | Strong et al. | 137/884 |
| 5,647,945 A | 7/1997 | Matsuse et al. | 156/345.38 |
| 5,653,259 A | 8/1997 | Ramstad | 137/606 |
| 5,769,110 A | 6/1998 | Ohmi et al. | |
| 5,819,782 A | 10/1998 | Itafuji | 137/240 |
| 5,983,933 A | 11/1999 | Ohmi et al. | 137/597 |
| 6,012,479 A | 1/2000 | Fukushima et al. | 137/271 |
| 6,022,586 A | 2/2000 | Hashimoto et al. | 427/237 |
| 6,035,893 A | 3/2000 | Ohmi et al. | 137/597 |
| 6,224,681 B1 | 5/2001 | Sivaramakrishnam et al. | 118/726 |
| 6,251,188 B1 * | 6/2001 | Hashimoto et al. | 118/715 |
| 6,257,270 B1 | 7/2001 | Ohmi et al. | 137/240 |
| 6,273,139 B1 | 8/2001 | Ohmi et al. | 137/884 |
| 6,298,881 B1 | 10/2001 | Curran et al. | 137/884 |

FOREIGN PATENT DOCUMENTS

| | | |
|---|---|---|
| JP | 63-072373 U | 5/1988 |
| JP | 4-21751 | 4/1992 |
| JP | 6-267870 | 9/1994 |
| JP | 7-153696 | 6/1995 |
| JP | 9-64025 | 3/1997 |
| JP | 10-11147 | 1/1998 |
| JP | 11-2384 | 1/1999 |
| JP | 11-51226 | 2/1999 |
| JP | 11-218529 | 8/1999 |
| WO | 98/10857 | 3/1998 |

OTHER PUBLICATIONS

Japanese Office Action issued for 11-211849 on Mar. 17, 2009 with English translation.

Japanese Office Action issued for 2000-254545 on Mar. 17, 2009 with English translation.

* cited by examiner

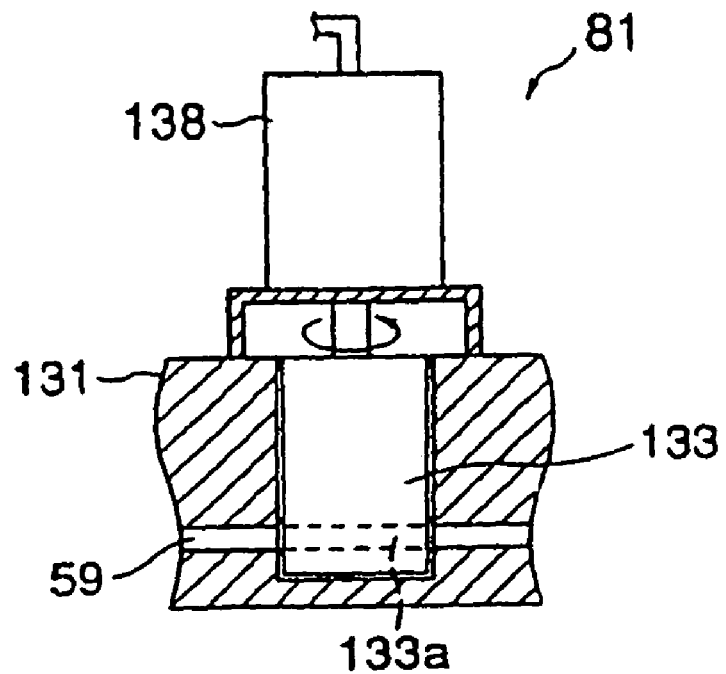
F I G. 4(a)
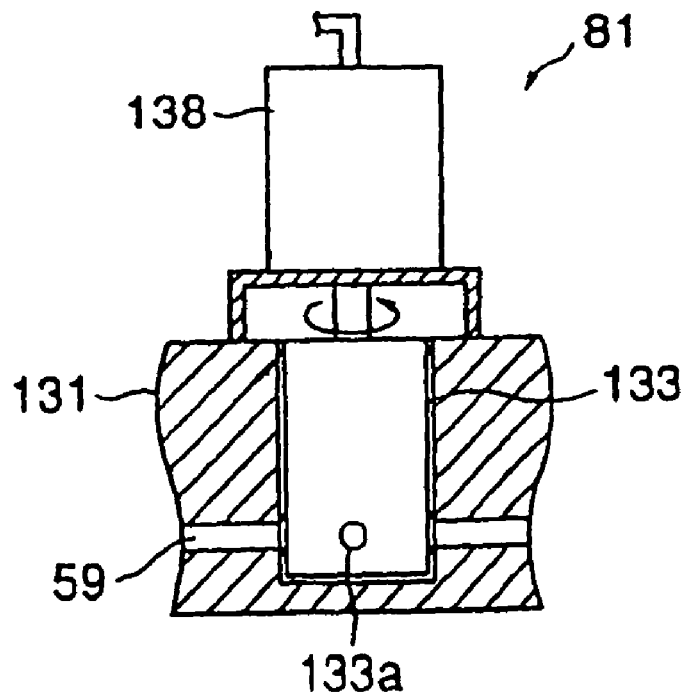
F I G. 4(b)

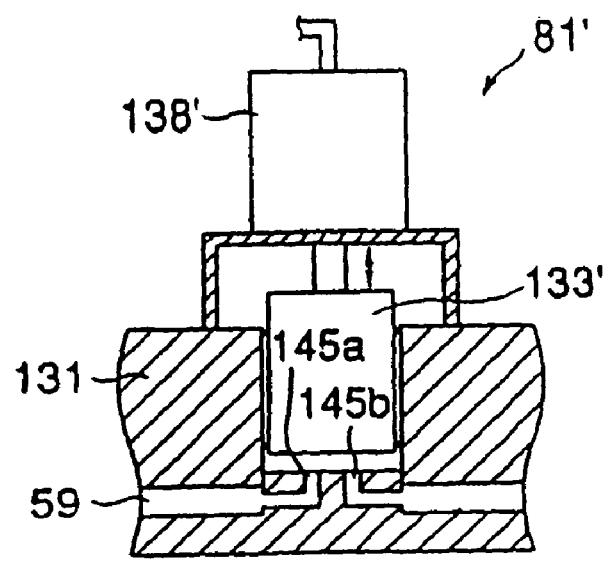
F I G. 6
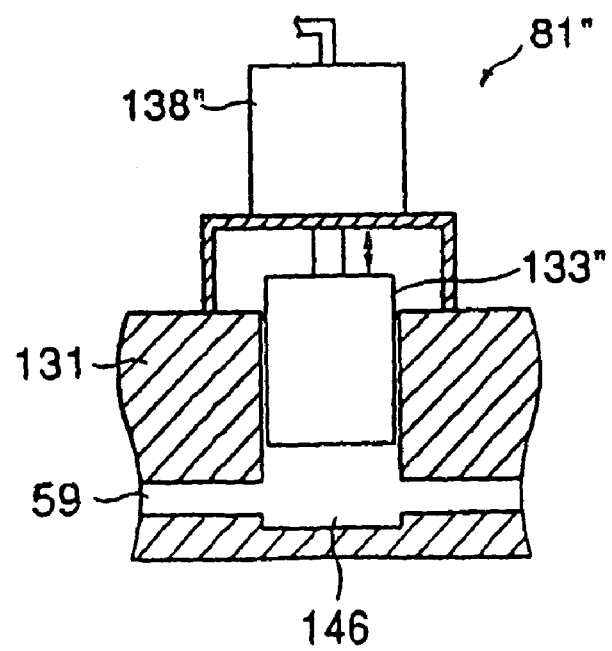
F I G. 7

(a) LINE LENGTH: 10 cm (b) LINE LENGTH: 20 cm (a) DIAMETER: 6 mm (b) DIAMETER: 12 mm

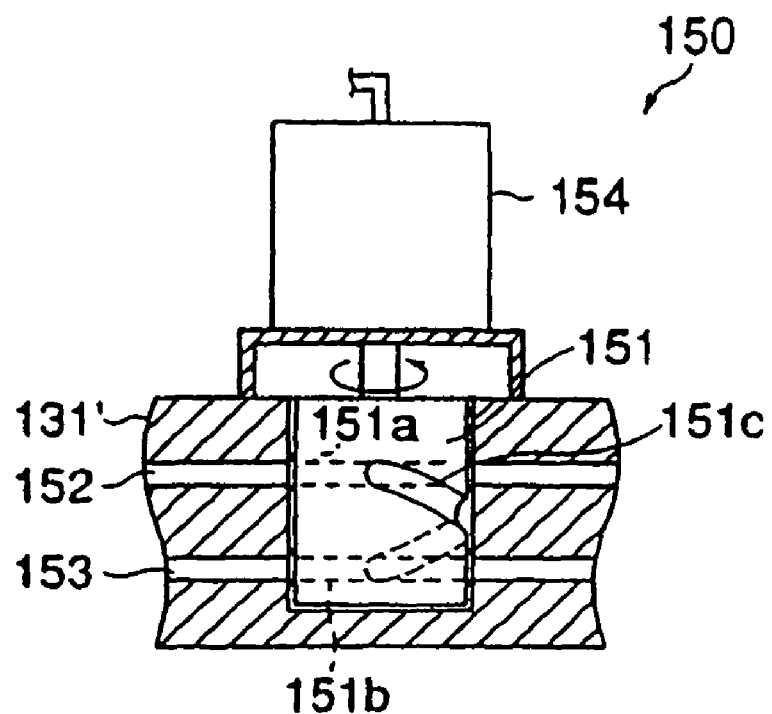
F I G. 15 (a)
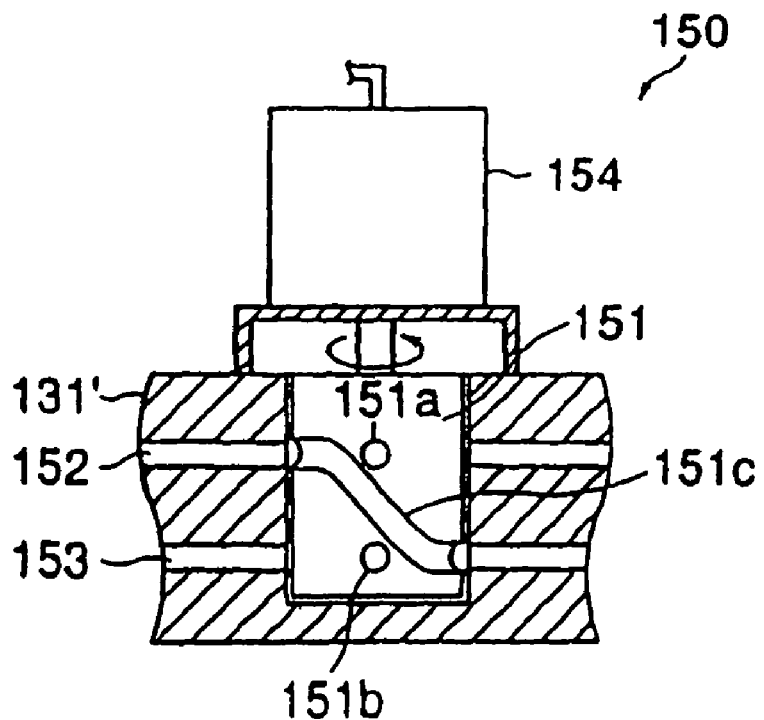
F I G. 15 (b)

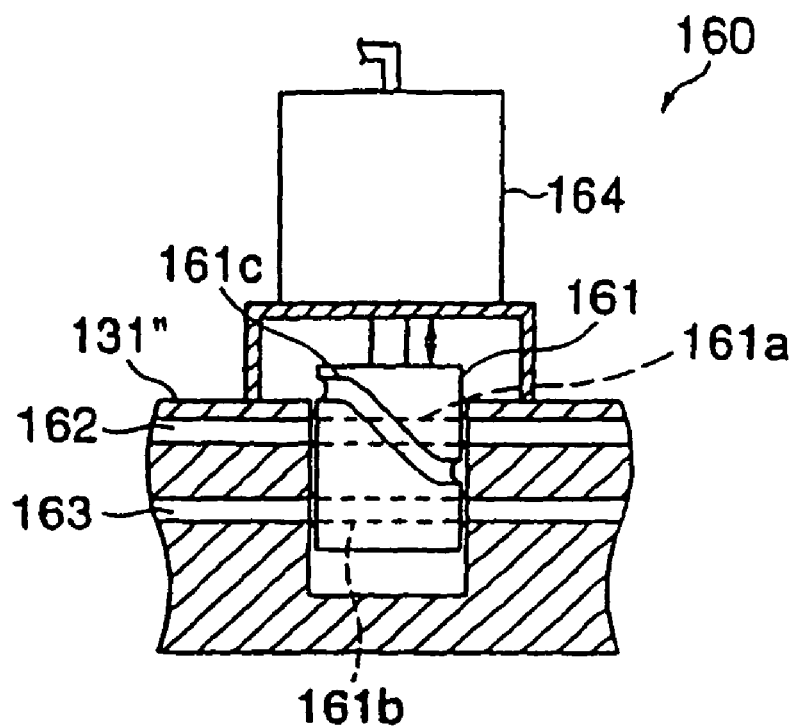
F I G. 16 (a)
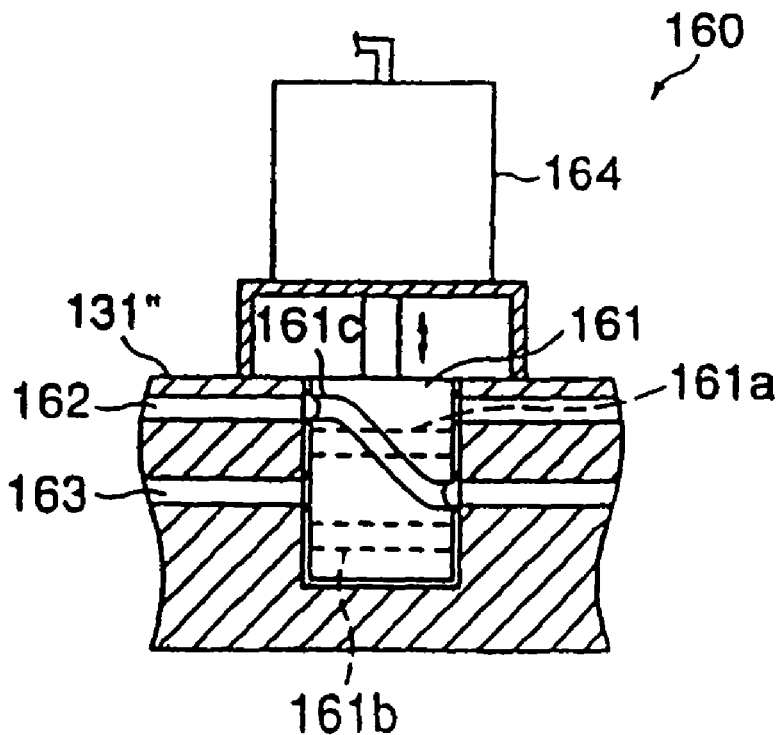
F I G. 16 (b)

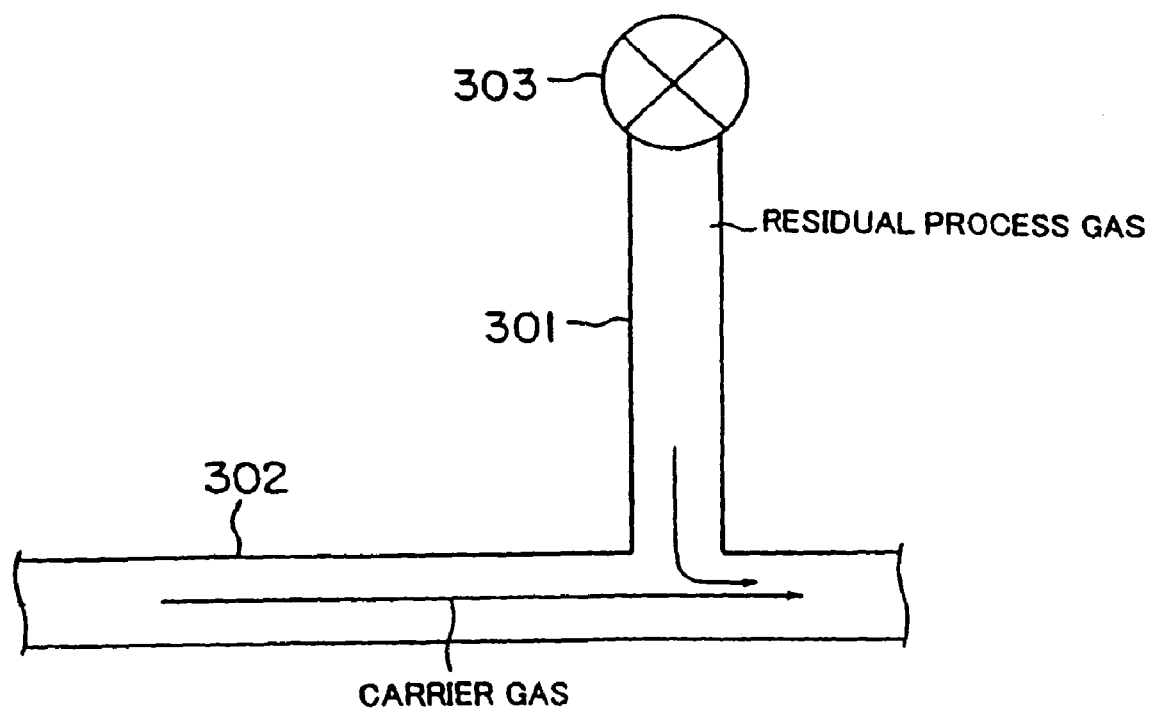
F I G. 26

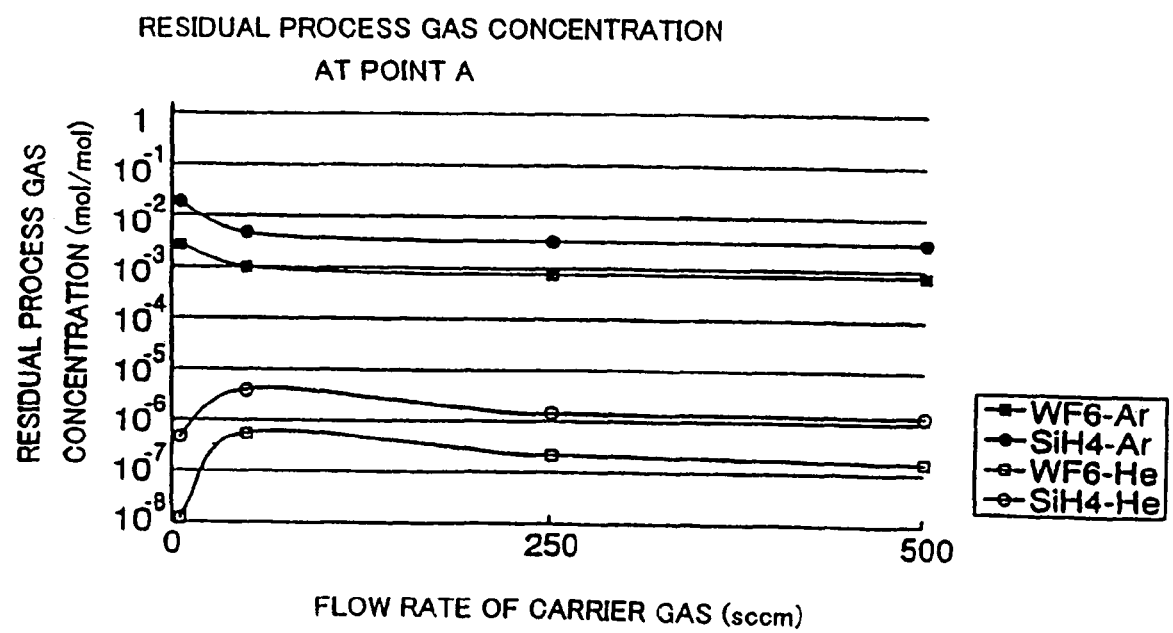
F I G. 29

GAS PROCESSING APPARATUS, GAS PROCESSING METHOD AND INTEGRATED VALVE UNIT FOR GAS PROCESSING APPARATUS

CROSS REFERENCE TO RELATED APPLICATIONS

This application is a divisional of Ser. No. 10/979,094 filed Nov. 2, 2004 now abandoned, which is a divisional of Ser. No. 10/437,396 filed May 14, 2003, now U.S. Pat. No. 6,817,381, which is a divisional of Ser. No. 09/644,647 filed Aug. 24, 2000, now abandoned. Each application referenced in this paragraph is incorporated herein by reference.

BACKGROUND OF THE INVENTION

1. Field of the Invention

The present invention relates to a gas processing method, such as a method of forming a film by chemical vapor deposition, a gas processing apparatus for carrying out the gas processing method, and an integrated valve unit to be incorporated into such a gas processing apparatus.

2. Description of the Related Art

A film of a metal or a metal compound, such as W (tungsten), WSi (tungsten silicide), Ti (titanium), TiN (titanium nitride), TiSi (titanium silicide) or the like, is deposited to form a wiring pattern on semiconductor wafer (hereinafter referred to simply as "wafer"), i.e., a workpiece, or to fill up holes between wiring lines in a semiconductor device manufacturing process. When depositing a WSi film, $WF_6$ gas (tungsten hexafluoride gas), $SiH_4$ gas (silane gas) or $SiH_2Cl_2$ gas (dichlorosilane gas) is used as a process gas.

When forming a WSi film, a mixture of the process gas and a carrier gas is supplied into a processing chamber, and a wafer placed in the processing chamber is heated to react the same with the process gas. In an initial stage of the process, the flow rate of the $WF_6$ gas is controlled strictly so that a desired nucleation film is formed to enable the formation of a film of an improved film quality. With this object in view, a gas processing apparatus for forming a film of an improved quality is provided with a nucleation $WF_6$ gas supply line capable of strictly controlling the flow of $WF_6$ gas and a deposition $WF_6$ gas supply line.

When selecting the deposition $WF_6$ gas supply line while the nucleation $WF_6$ gas supply line is being used, $WF_6$ gas remains in a downstream section of the nucleation $WF_6$ gas supply line below a valve placed in the nucleation $WF_6$ gas supply line. If a large amount of $WF_6$ gas remains in the downstream section of the nucleation $WF_6$ gas supply line, the $WF_6$ gas is drawn out of the downstream section by the carrier gas. Consequently, $WF_6$ gas is supplied excessively into the processing chamber and a film of a desired quality cannot be formed.

SUMMARY OF THE INVENTION

The present invention has been made in view of the foregoing problem and it is therefore an object of the present invention to provide a gas processing apparatus and a gas processing method capable of reducing the amount of a process gas that flows out from a process gas line after the supply of the process gas through the process gas line has been stopped.

Another object of the present invention to provide an integrated valve unit suitable for use on such a gas processing apparatus.

According to a first aspect of the present invention, an integrated valve unit to be placed in a process gas line included in a gas processing apparatus including a processing vessel capable of processing a substrate in the processing chamber by using a process gas supplied through the process gas line into the processing chamber. The integrated valve unit includes: a base block provided with a valve bore and first and second gas lines opening into the valve bore; a valve element fitted in the valve bore of the base block so as to be movable; and an actuator that drives the valve element.

According to a second aspect of the present invention, a gas processing apparatus is provided with the integrated valve unit according to the first aspect of the present invention.

According to a third aspect of the present invention, a gas processing apparatus is provided, which includes: a first gas line that supplies a process gas, a second gas line connected to the first gas line at a joint to supply a carrier gas for carrying the process gas; a processing vessel in which a substrate is subjected to a predetermined gas process; and a third gas line that guides a mixed gas of the process gas and the carrier gas from the joint into the processing vessel; wherein the respective axes of the first and the third gas line are substantially aligned, the axis of the second gas line is inclined to the axis of the third gas line.

According to a fourth aspect of the present invention, a gas processing apparatus is provided, which includes: a first gas line that supplies a first process gas, a second gas line that supplies a second process gas connected to the first gas line at a joint; a third gas line that supplies a carrier gas for carrying either the first or the second process gas connected to the joint, a processing vessel in which a substrate is subjected to a predetermined gas process; and a fourth gas line that guides a mixed gas of the carrier gas and either the first or the second process gas from the joint into the processing vessel; wherein the respective axes of the third and the fourth gas line are substantially aligned in the vicinity of the joint, the respective axes of the first and the second gas line are inclined at angles, respectively, to the axis of the third gas line.

According to a fifth aspect of the present invention, a gas processing method is provided, which includes: a step of preparing a gas processing apparatus including a process gas line that supplies a process gas, a carrier gas line that supplies a carrier gas and connected to the process gas line at a joint, a processing vessel into which a mixed gas of the process gas and the carrier gas is supplied; and a step of supplying the process gas through the process gas line, and supplying the carrier gas having a molecular weight of 30 or below through the carrier gas line to supply the mixed gas of the process gas and the carrier gas into the processing chamber to process a substrate placed in the processing chamber by a gas process using the process gas.

According to a sixth aspect of the present invention, a gas processing apparatus is provided, which includes: a process gas line that supplies a process gas; a carrier gas line that supplies a carrier gas for carrying the process gas connected to the process gas line at a joint; a processing vessel into which a mixed gas of the process gas and the carrier gas is supplied and in which a substrate placed therein is subjected to a predetermined gas process using the process gas, a openclose valve placed in the process gas line at a position upstream of the joint; wherein the distance between the joint and the open-close valve and the sectional area of the process gas line are so determined that the amount of the process gas that flows out from the process gas line after the open-close valve has been closed is not greater than a predetermined value.

BRIEF DESCRIPTION OF THE DRAWINGS

FIG. 4 is a sectional view of a open-close valve applied to the integrated valve unit shown in FIG. 3;

FIG. 6 is a sectional view of another open-close valve applied to the integrated valve unit;

FIG. 7 is a sectional view of a third open-close valve applied to the integrated valve unit;

FIG. 15 is a sectional view of assistance in explaining the construction and operation of a valve incorporated into an integrated valve unit capable of selectively opening two lines;

FIG. 16 is a sectional view of assistance in explaining the construction and operation of another valve incorporated into an integrated valve unit capable of selectively opening two lines;

FIG. 26 is a typical view of assistance in explaining the principle of a third embodiment according to the present invention;

FIG. 29 is a graph showing the dependence of residual process gas concentration at a point A in FIG. 27 on carrier gas flow rate determined on the basis of the results of simulation;

DESCRIPTION OF THE PREFERRED EMBODIMENTS

Preferred embodiments of the present invention will be described hereinafter with reference to the accompanying drawings.

First Embodiment

A CVD system in a first embodiment according to the present invention will be described with reference to FIGS. 1 to 6.

Figure 1:
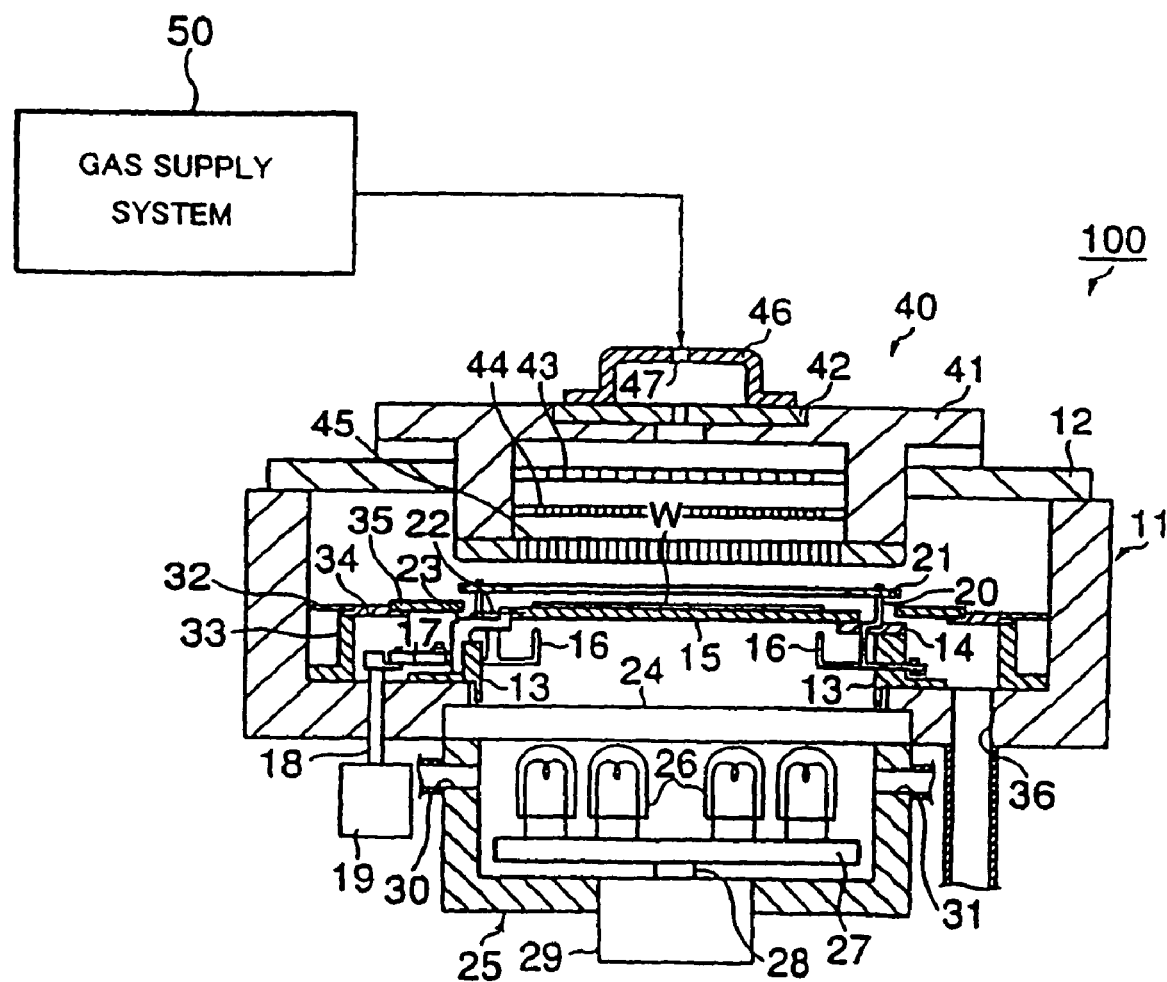
FIG. 1 is a typical sectional view of a CVD system in a first embodiment according to the present invention.

FIG. 1 is a typical sectional view of the CVD system 100 in the first embodiment for forming a WSi film.

Referring to FIG. 1, the CVD system 100 has a cylindrical vessel 100 of, for example, aluminum covered with a lid 12. A wafer table 15 for supporting a wafer W thereon held in the vessel 11 by a holding member 14 on a support member 13 placed on the bottom wall of the vessel 11. The inner circumference of the support member 13 is formed so as to reflect heat rays. The wafer table 15 has a thickness on the order of 2 mm and is formed of carbon or a ceramic material.

Lifting pins 16, for example, three lifting pins 16 for lifting up the wafer W from the wafer table 15 are disposed under the wafer table 15. The lifting pins 16 are held on a holding member 17 supported on a lifting rod 18 connected to an actuator 19. The actuator 19 moves the lifting rod 18 vertically to move the wafer W vertically by vertically moving the lifting pins 16 through the lifting rod 18 and the holding member 17. The lifting pins 16 are formed of a material that transmits heat rays, such as quartz. A support member 20 is formed integrally with the lifting pins 16 and a shield ring 21 is attached to the support member 20. The shield ring 21 intercepts heat rays emitted by halogen lamps 26 (described later) to prevent the upward propagation of the heat rays and secures a passage for a cleaning gas during a cleaning operation. A thermocouple 22 is embedded in the wafer table 15 to measure the temperature of the wafer W when heating the wafer W. A holding member 23 holding the thermocouple 22 is attached to the support member 13.

A transparent plate 24 formed of a material that transmits heat rays, such as quartz, is hermetically fitted in the bottom wall of the vessel 11 in a region directly below the wafer table 15. A box-shaped heating vessel 25 is disposed under the transparent plate 24 so as to surround a space under the transparent plate 24. The four halogen lamps 26 are supported on a turntable 27 serving also as a reflecting mirror in the heating vessel 25. The turntable 27 is rotated through a shaft 28 connected thereto by a motor 29 held on the bottom wall of the heating vessel 25. Heat rays emitted by the halogen lamps 26 propagate through the transparent plate 24 and fall on the lower surface of the wafer table 15 to heat the wafer table 15. The side wall of the heating vessel 25 is provided with a cooling air inlet port through which cooling air for cooling the interior of the heating vessel 25 and the transparent plate 24 is supplied into the heating vessel 25, and a cooling air outlet port 31 through which cooling air is discharged outside.

An annular baffle plate 32 provided with a plurality of current holes is mounted on a water-cooled plate 34 supported on a support column 33 so as to surround the wafer table 15. An annular plate 35 of quartz or aluminum is disposed inside the water-cooled plate 34 to prevent the downflow of a process gas. An inert gas that does not react with the process gas during a film forming process, such as nitrogen gas, is supplied as a backside gas into a space extending under the baffle plate 32, the water-cooled plate 34 and the annular plate 35 to prevent the undesired deposition of films by the process gas that flows into the space under the wafer support table 15.

Exhaust ports 36 are formed in the four corners of the bottom wall of the vessel 11, and a vacuum pump, not shown, is connected to the exhaust ports 36 to maintain the interior of the vessel 11 at a vacuum in the range of, for example, 100 to $10^{-6}$ torr.

A shower head 40 for supplying a process gas and other gases into the vessel 11 is incorporated into the lid 12 of the vessel 11. The shower head 40 has a shower base 41 fitted in an opening formed in the lid 12. An orifice plate 42 is fitted in a central recess formed in an upper wall of the shower base 41. The process gas and other gases are supplied through the orifice plate 42. Two diffusion plates 43 and 44 are disposed below the orifice plate 42, and a shower plate 45 is disposed below the diffusion plates 43 and 44. A gas supplying member 46 provided with a gas inlet port 47 is disposed on top of the orifice plate 42. The gas inlet port 47 is connected to a gas supply system 50 for supplying the process gas and other gases into the vessel 11.

Figure 2:
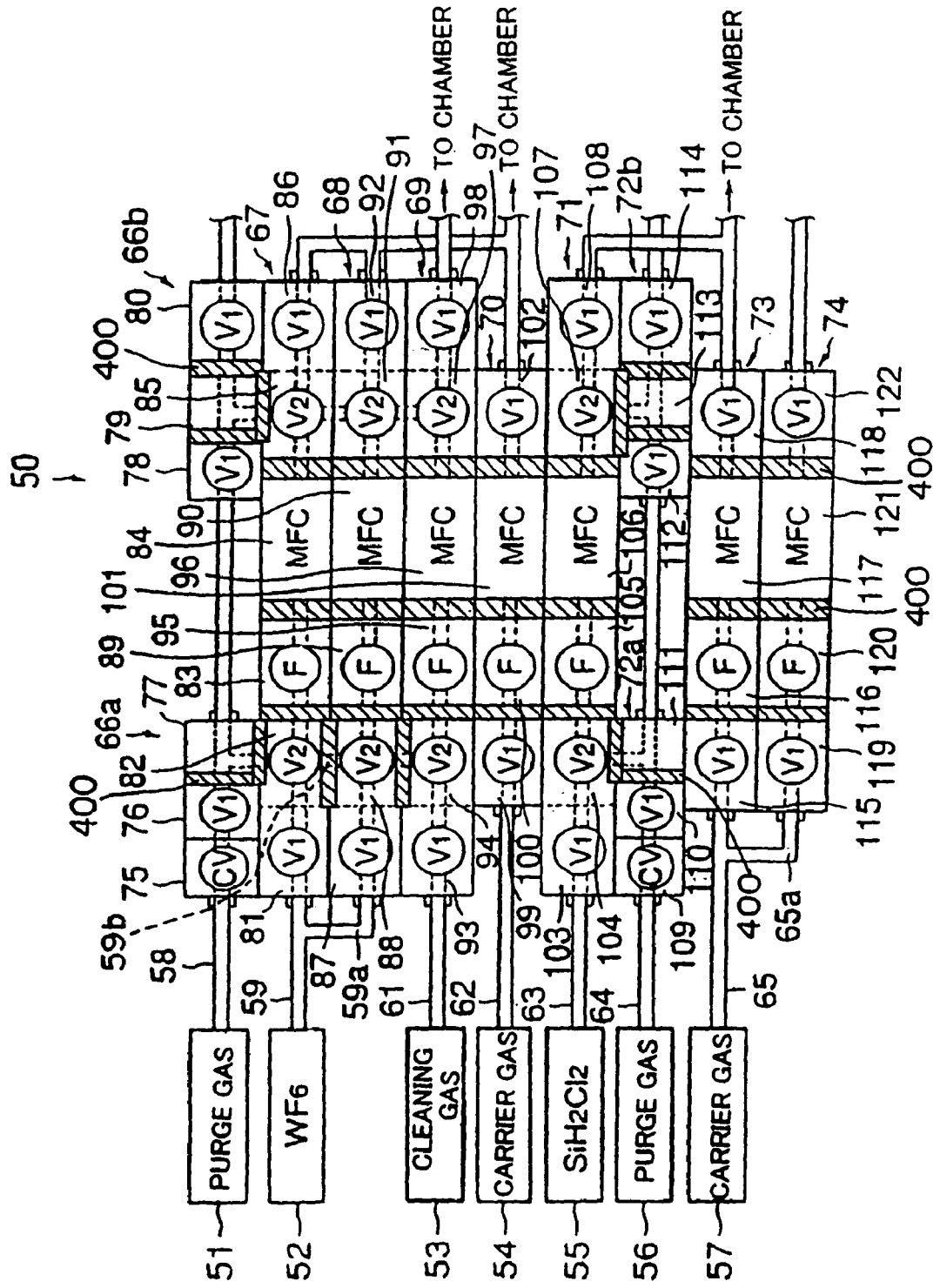
FIG. 2 is a schematic plan view of a gas supply system included in the CVD system shown in FIG. 1.

Referring to FIG. 2, the gas supply system 50 includes a purge gas source 51 for supplying a purge gas, such as $N_2$ gas, to a $WF_6$ gas line, a $WF_6$ gas source 52, a cleaning gas source 53 for supplying a cleaning gas, such as $ClF_3$ gas, a carrier gas source 54 for supplying a carrier gas, such as Ar gas, for carrying $WF_6$ gas, an $SiH_2Cl_2$ gas source 55, a purge gas source 56 for supplying a purge gas, such as $N_2$ gas, to an $SiH_2Cl_2$ gas line, and a carrier gas source 57 for supplying a carrier gas, such as Ar gas, to carry $SiH_2Cl_2$ gas. A purge gas line 58, a $WF_6$ gas line 59, a cleaning gas line 61, a carrier gas line 62, an $SiH_2Cl_2$ gas line 63, a purge gas line 64 and a carrier gas line 65 are connected to the purge gas source 51, the $WF_6$ gas source 52, the cleaning gas source 53, the carrier gas source 54, the $SiH_2Cl_2$ gas source 55, the purge gas source 56 and the carrier gas source 57, respectively. A branch line 59a and a branch line 65a are connected to the $WF_6$ gas line 59 and the carrier gas line 65, respectively.

Two integrated valve units 66a and 66b are placed in the purge gas line 58. An integrated valve unit 67 is placed in the $WF_6$ gas line 59, an integrated valve unit 68 is placed in the branch line 59a connected to the $WF_6$ gas line 59, an integrated valve unit 69 is placed in the cleaning gas line 61, an integrated valve unit 70 is placed in the carrier gas line 62, an integrated valve unit 71 is placed in the $SiH_2Cl_2$ gas line 63, two integrated valve units 72a and 72b are placed in the purge gas line 56, an integrated valve unit 73 is place in the carrier gas line 65 and an integrated valve unit 74 is placed in the branch line 65a connected to the carrier gas line 65.

Each integrated valve unit is formed by integrally combining a plurality of valves. The integrated valve units are combined integrally in a small unit to save space for installation.

An integrated valve unit 66a placed in an upper section of the purge gas line 58 has a check valve 75, a open-close valve 76 and a branch block 77 having branch lines arranged in that order along in the direction of gas flow. The integrated valve unit 66b placed in a lower section of the purge gas line 58 has a open-close valve 78, a branch block 79 having branch lines and a three-way valve 80 arranged in that order in the direction of gas flow.

The integrated valve unit 67 placed in the $WF_6$ gas line 59 has a open-close valve 81, a three-way valve 82, a filter 83, a mass flow controller 84, a three-way valve 85 and three-way valve 86 arranged in that order in the direction of gas flow.

The integrated valve unit 68 placed in the branch line 59a has a open-close valve 87, a three-way valve 88, a filter 89, a mass flow controller 90, a three-way valve 91 and a three-way valve 92 arranged in that order in the direction of gas flow.

The integrated valve unit 69 placed in the cleaning gas line 61 has a open-close valve 93, a three-way valve 94, a filter 95, a mass flow controller 96, a three-way valve 97 and a open-close valve arranged in that order in the direction of gas flow.

The integrated valve unit 70 placed in the carrier gas line 62 has a open-close valve 99, a filter 100, a mass flow controller 101 and a open-close valve 102 arranged in that order in the direction of gas flow.

The integrated valve unit 71 placed in the $SiH_2Cl_2$ gas line 63 has a open-close valve 103, a three-way valve 104, a filter 105, a mass flow controller 106, a three-way valve 107 and a open-close valve 108 arranged in that order in the direction of gas flow.

The integrated valve unit 72a placed in an upper section of the purge gas line 64 has a check valve 109, a open-close valve 110 and a branch block 111 having branch lines arranged in that order in the direction of gas flow. The integrated valve unit 72b placed in a lower section of the purge gas line 64 has a open-close valve 112, a branch block 113 having branch lines, and a open-close valve 114 arranged in that order in the direction of gas flow.

The integrated valve unit 73 placed in the carrier gas line 65 has a open-close valve 115, a filter 116, a mass flow controller 117 and a open-close valve arranged in that order in the direction of gas flow.

The branch line 65a connected to the carrier gas line 65 has a open-close valve 119, a filter 120, a mass flow controller 121 and a open-close valve 122 arranged in that order in the direction of gas flow.

In FIG. 2, symbols CV, V1, V2, F and MFC represent check valves, open-close valves, three-way valves, filters and mass flow controllers, respectively.

A purge gas supplied to the purge gas line 58 is able to flow into the $WF_6$ gas line 59, the branch line 59a and the cleaning gas line 61 through the branch block 77 and the three-way valves 82, 88 and 94, respectively, or through the branch block 79 and the three-way valves 85, 91 and 97, respectively. A pure gas supplied to the purge gas line 64 is able to flow into the SiH$_2$Cl$_2$ gas line 63 through the branch block 111 and the three-way valve 104 or through the branch block 113 and the three-way valve 107.

The WF$_6$ gas line 59 and the branch line 59a are joined to the carrier gas line 62 at a position below the integrated valve units. The SiH$_2$Cl$_2$ gas line 63 is joined to the carrier gas line 65 at a position below the integrated valve units. The carrier gas lines 62 and 65, and the cleaning gas line 61 are connected to the gas inlet port 47 of the vessel 11.

The integrated valve units 68, 69, 70, 71, 73 and 74 are slightly different from each other and are substantially the same in construction and hence the construction of the integrated valve unit 67 placed in the WF$_6$ gas line 59 will be described by way of example.

Figure 3:
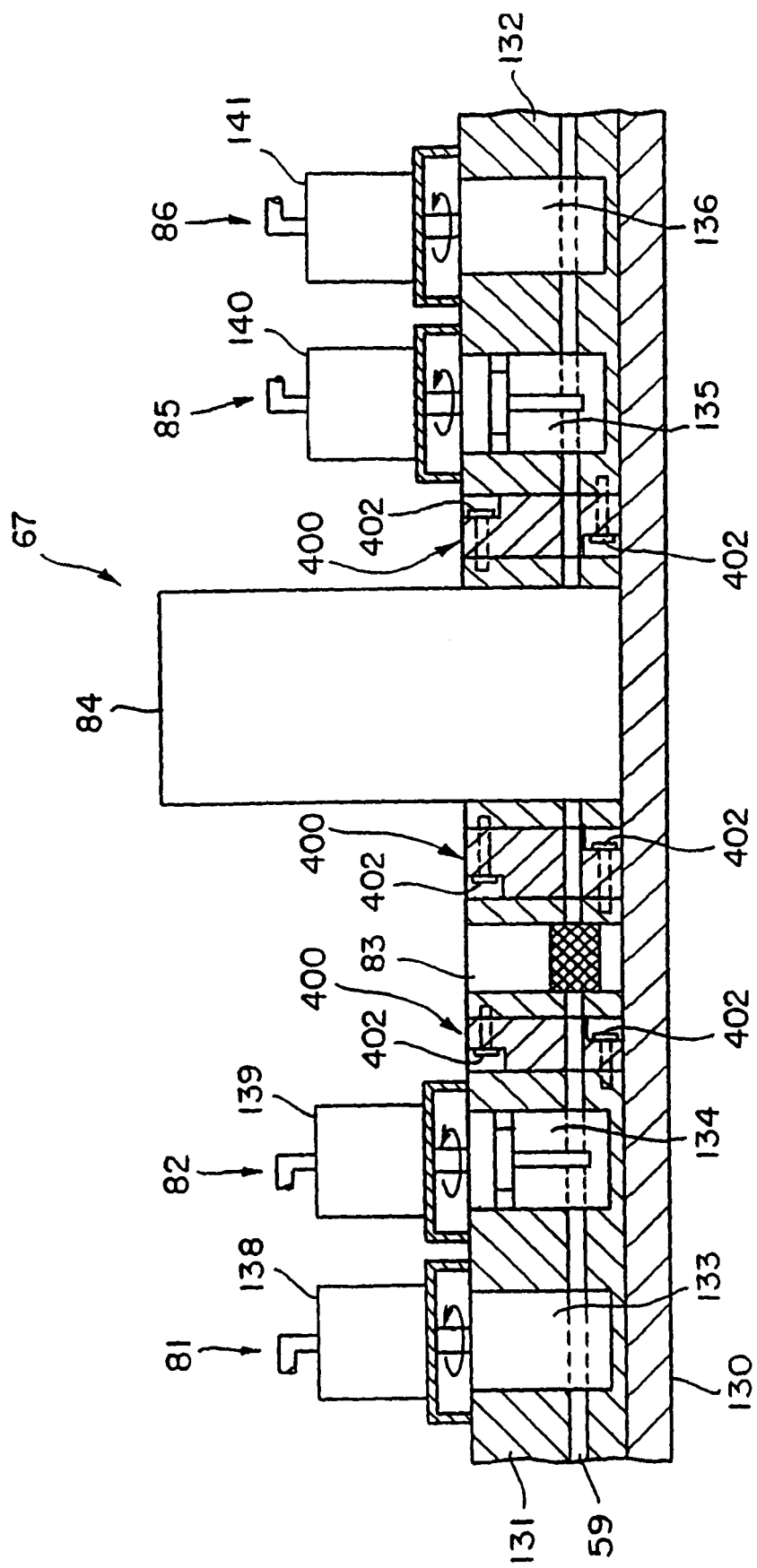
FIG. 3 is a sectional view of an integrated valve unit included in the gas supply system.

Referring to FIG. 3, the integrated valve unit 67 placed in the WF$_6$ gas line 59 has the open-close valve 81, the three-way valve 82, the filter 83, the mass flow controller 84 and the three-way valve 85 and the three-way valve 86 successively arranged in that order in the direction of gas flow and united together in a unit. Those components of the integrated valve unit 67 are mounted on and attached to a base block 130. The respective valve element 133 and 134 of the open-close valve 81 and the three-way valve 82 are placed in a block 131. The respective valve elements 135 and 136 of the three-way valve 85 and the three-way valve 86 are placed in a block 132. The WF$_6$ gas line 59 extends through the blocks 131 and 132. The respective valve elements 133, 134, 135 and 136 of the open-close valve 81, the three-way valve 82, the three-way valve 85 and the three-way valve 86 are turned by actuators 138, 139, 140 and 141, respectively, for flow regulation. The valve elements 133, 134, 135 and 136 act directly on the WF$_6$ gas line 59.

As shown in FIG. 4, the valve element 133 of the open-close valve 81 is provided with a through hole 133a in a portion thereof corresponding to the WF$_6$ gas line 59. The open-close valve 81 is open when the through hole 133a is connected to the WF$_6$ gas line 59 as shown in FIG. 4(a). The open-close valve 81 is closed when the through hole 133a is disconnected from the WF$_6$ gas line 59.

Figure 5A:
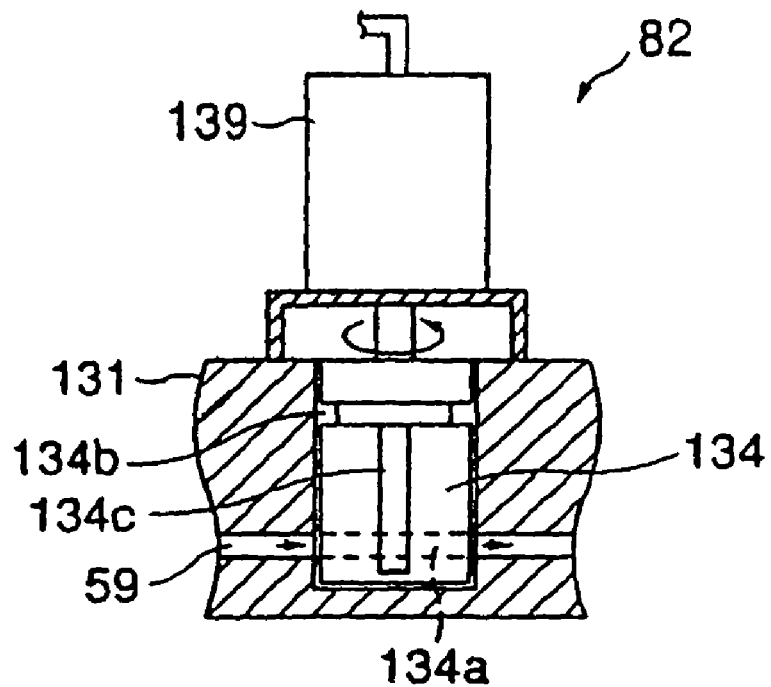
FIG. 5 is a sectional view of assistance in explaining the construction and operation of a three-way valve applied to the integrated valve unit shown in FIG. 3.
Figure 5B:
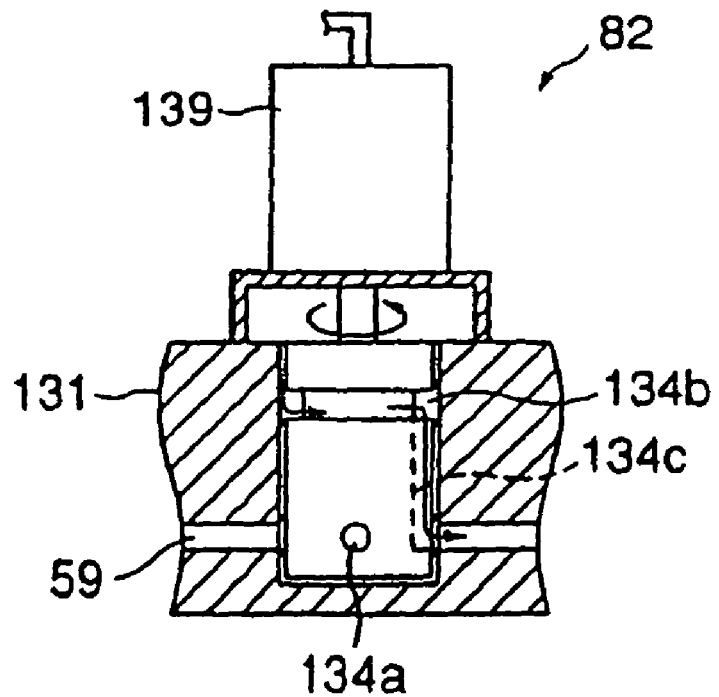

As shown in FIG. 5, the valve element 134 of the three-way valve 82 is provide with a through hole 134a in a portion thereof corresponding to the WF$_6$ gas line 59, an annular groove 134b capable of feeding a purge gas from the purge gas line 58 in an upper portion thereof, and a longitudinal groove 134c formed in the circumference thereof so as to extend from the annular groove 134b to the portion thereof corresponding to the WF$_6$ gas line 59. The WF$_6$ gas line 59 is continuous and the purge gas passage is blocked when the through hole 134a is connected to the WF$_6$ gas line 59 as shown in FIG. 5(a). When the valve element 134 is turned from a position shown in FIG. 5(a) to a position shown in FIG. 5(b), the through hole 134a is disconnected from the WF$_6$ gas line 59 and the longitudinal groove 134c is connected to the WF$_6$ gas line 59. Consequently, the WF$_6$ gas line 59 is blocked and the purge gas flows through the annular groove 134b and the longitudinal groove 134c into the WF$_6$ gas line 59. The functions of the three-way valves 85 and 86 are similar to those of the three-way valve 82.

A open-close valve 81' having a valve element 133' and an actuator 138' shown in FIG. 6 may be used. A port 145a communicating with an upper section of the WF$_6$ gas line 59 with respect to the open-close valve 81' and a port 145b communicating with a lower section of the WF$_6$ gas line 59 with respect to the open-close valve 81' can be closed by lowering the valve element 133' by the actuator 138'.

A open-close valve 81" having a valve element 133" and an actuator 183" shown in FIG. 7 may be used. The WF$_6$ gas line 59 can be blocked by lowering the valve element 133" into a recess 146 by the actuator 138".

Figure 7A:
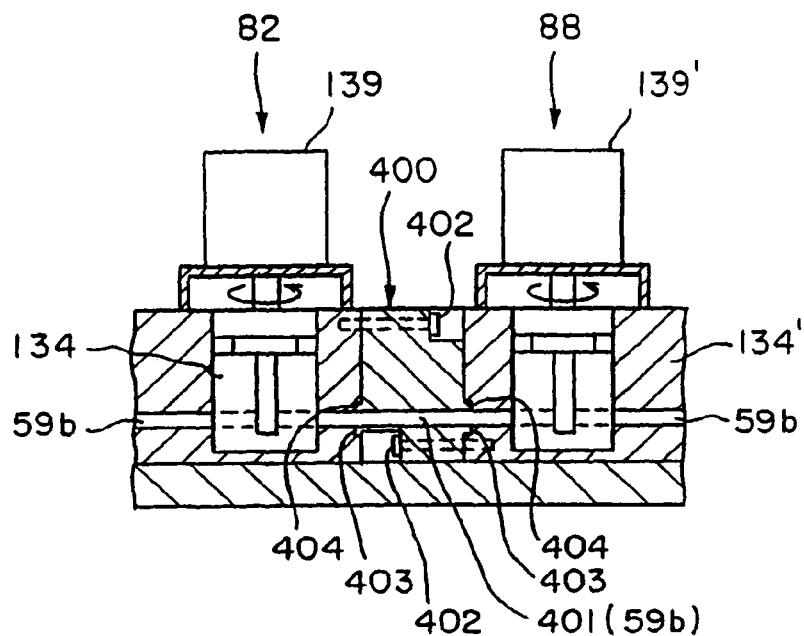
FIG. 7A is a sectional view of a valve structure formed by joining together integrated valve units.
Figures 7B, 7C:
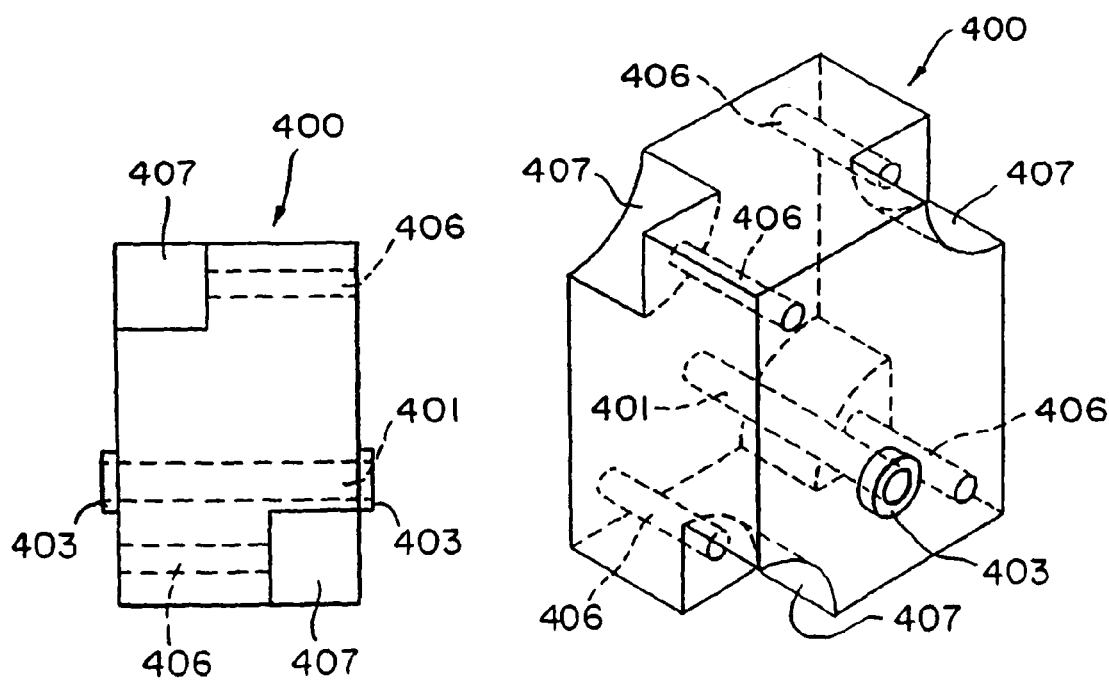
FIGS. 7B and 7C are a side elevation and a perspective view, respectively, of a joint block included in the valve structure shown in FIG. 7A.

Referring again to FIG. 2, a joint block 400 is interposed between the adjacent blocks. As shown in FIG. 3, the WF$_6$ gas line 59 extends across the block 131 provided with the open-close valve 81 and the three-way valve 82, a block containing the filter element of the filter 83, a block containing the control mechanism of the mass flow controller 84, and the block 132 provided with the three-way valves 85 and 86. Those blocks on the WF$_6$ gas line 59 are connected by those joint blocks 400. As shown in FIG. 7A, a gas line 59b intersecting the WF$_6$ gas line 59 extends across the branch block 77, the block provided with the three-way valve 82, a block provided with the three-way valve 88 and a block provided with the three-way valve 94. The blocks on the gas line 59b are connected by the joints 400. FIGS. 7B and 7C show the joint block 400.

A connecting structure connecting the blocks will be described with reference to FIGS. 7A, 7B and 7C. The joint block 400 is interposed between the three-way valves 82 and 88. The joint block 400 is provided with a passage 401 extending across the joint block 400 and serving as a section of the gas line 59b. Projections 403 are formed on the opposite end surfaces of the joint block 400 at positions corresponding to the opposite ends of the passage 401. Recesses 404 complementary to the projections 403 are formed in end surfaces of the blocks provided with the three-way valves 82 and 88 facing the joint block 400. The projection 403 and the corresponding recess 404 form a joint resembling a swage joint. The joint block 400 is fastened to the three-way valves 82 and 88 by screwing bolts 402 in threaded holes formed in the blocks provided with the three-way valves 82 and 88. When the bolts 402 are fastened, washers, not shown, sandwiched between the projections 403 and the corresponding recesses 404 are crushed flat to form metal seals. In FIGS. 7B and 7C, indicated at 406 are holes for the bolts 402 and at 407 are recesses to secure clearances for the operation of the heads of the bolts 402.

The blocks shown in FIG. 3 are connected by connecting structures similar to that shown in FIG. 7A. The blocks on the opposite sides of the blocks 400 shown in FIG. 2 indicated by shaded sections are connected by connecting structures similar to that shown in FIG. 7A.

When forming a WSi film over a surface of a wafer W by the CVD system 100, a gate valve, not shown, incorporated into the side wall of the vessel 11 is opened, the wafer W is carried through the gate valve into the vessel 11 by a transfer arm, the lifting pins 16 are raised to transfer the wafer W from the transfer arm to the lifting pins 16, the lifting rod 18 is lowered together with the lifting pins 16 to place the wafer W on the wafer table 15.

Subsequently, the interior atmosphere of the vessel 11 is discharged through the discharge ports 36 to evacuate the vessel 11 to a vacuum in the range of, for example, 0.1 to 80 torr. Then, WF$_6$ gas and SiH$_2$Cl$_2$ gas are supplied by the gas supply system 50 through the shower head 40 into the vessel 11, the halogen lamps 26 placed in the heating vessel 25 are turned on and the turntable 27 are turned to heat the wafer table 15 by heat generated by the halogen lamps 26. Consequently, a WSi film is formed on the wafer W as the result of a predetermined thermochemical gas reaction.

The process gas supply operation of the gas supply system 50 will be described hereinafter.

The carrier gas, such as Ar gas, is supplied from the carrier gas source 54 to the carrier gas line 62, WF$_6$ gas, i.e., a first process gas, is supplied from the WF$_6$ gas source 52 to the branch line 59a connected to the WF$_6$ gas line 59, strictly controlling the flow rate of $WF_6$ gas by the precision mass flow controller 90 of the integrated valve unit 67 for nucleation. At the same time, the carrier gas, such as Ar gas, is supplied from the carrier gas source 57 to the carrier gas line 65 and $SiH_2Cl_2$ gas, i.e., a second process gas, is supplied from the $SiH_2Cl_2$ gas source 55 to the $SiH_2Cl_2$ gas line 62. $WF_6$ gas supplied to the branch line 59a flows into the carrier gas line 62. $SiH_2Cl_2$ gas supplied to the $SiH_2Cl_2$ gas line 63 flows into the carrier gas line 65. Thus, $WF_6$ gas and $SiH_2Cl_2$ gas are supplied together with the carrier gas through the shower head 40 into the vessel 11.

After a predetermined time has passed, the valves of the integrated valve unit 68 placed in the branch line 59a are closed to stop supplying $WF_6$ gas to the branch line 59a, and the valves of the integrated valve unit 67 placed in the $WF_6$ gas line 59 are opened to supply $WF_6$ gas through the $WF_6$ gas line 59 into the carrier gas line 62 at a flow rate higher than that at which $WF_6$ is supplied for nucleation.

After a film forming process using the process gases thus supplied into the vessel 11 has been completed, $N_2$ gas, i.e., a purge gas, is supplied from the purge gas source 51 and 56 through the $WF_6$ gas line 59, the branch line 59s and the $SiH_2Cl_2$ gas line 63 to purge the same. Subsequently, $ClF_3$ gas, i.e., a cleaning gas, is supplied from the cleaning gas source 53 through the cleaning gas line 61 into the vessel 11 for cleaning. Then, a purge gas is supplied from the purge gas source 51 through the cleaning gas line 61 to purge the vessel 11 of the cleaning gas to prepare the vessel 11 for the next cycle of the film forming process.

When the passage of $WF_6$ gas is changed from the branch line 59a for nucleation to the $WF_6$ gas line 59 for film formation during the film forming process, $WF_6$ gas remains in a lower section of the branch line 59a below the integrated valve unit 68 and the residual $WF_6$ gas is sucked out of the lower section of the branch line 59a by the carrier gas. The shorter the distance between the joint of the carrier gas line 62 and the branch line 59a and the lowermost valve of the integrated valve unit 68, i.e., the valve 92, and the smaller the diameter of the branch line 59a, the smaller the amount of the residual $WF_6$ gas. Therefore, it is desirable to reduce the distance between the joint of the carrier gas line 62 and the branch line 59a and the lowermost valve 92 to the shortest possible extent and to use the branch line 59a having the smallest possible diameter in order that the amount of the residual process gas remaining in the process gas line is not greater than a predetermined value that will not affect film formation.

Results of simulation on the basis of which such a conclusion was made will be explained hereinafter.

Figure 8:
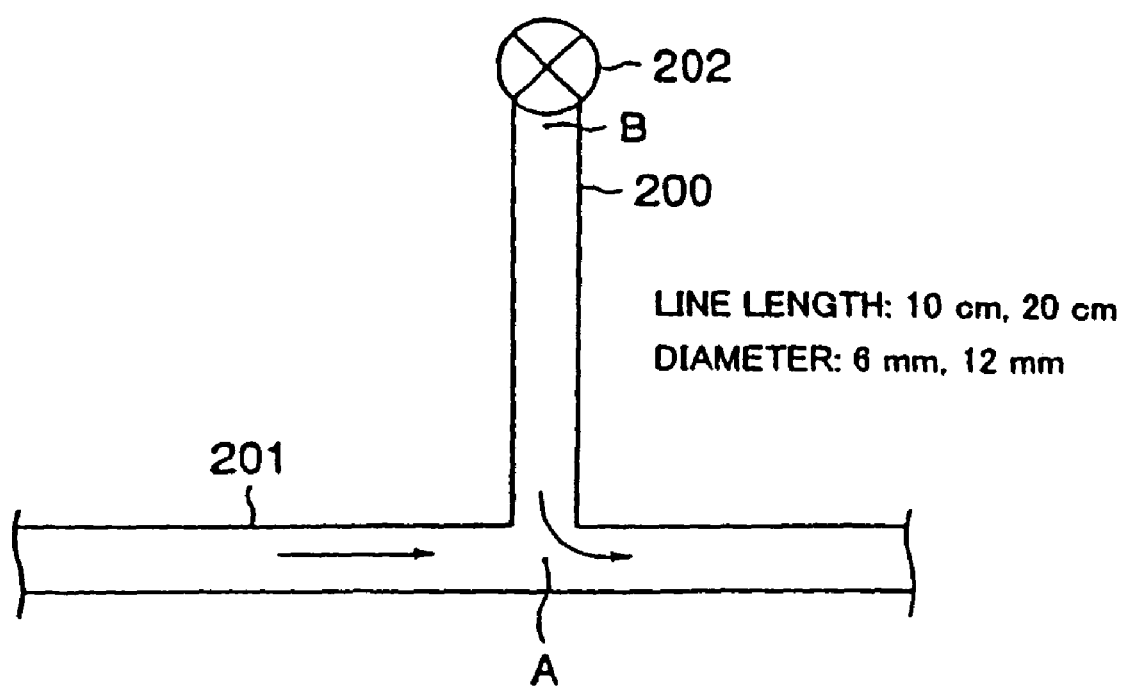
FIG. 8 is a typical view of a gas line of assistance in explaining conditions for simulation for analyzing the relation between the dimensions of a gas line and the concentration of residual process gas.

A simulation model of a joint structure shown in FIG. 8 was used for simulation. The simulation model includes a process gas line 200, a carrier gas line 201 and a valve 202. Parameters for simulation were line length (length of the process gas line 200 extending below the valve 202): 10 cm and 20 cm, inside diameter (inside diameter of pipes forming the process gas line 200 and the carrier gas line 201): 6 mm and 12 mm and carrier gas flow rate: 5, 50, 250 and 500 sccm. It was supposed that the process gas remains in the process gas line 200 extending below the valve 202. The valve 83 of the joint structure shown in FIG. 8 was closed while the carrier gas was supplied continuously through the carrier gas line 201 and residual process gas concentrations at a point B right under the valve 202 and a point A at the joint of the process gas line 200 and the carrier gas line 201 were determined by simulation using "FLUENT", i.e., a general-purpose analysis program.

Figure 9:
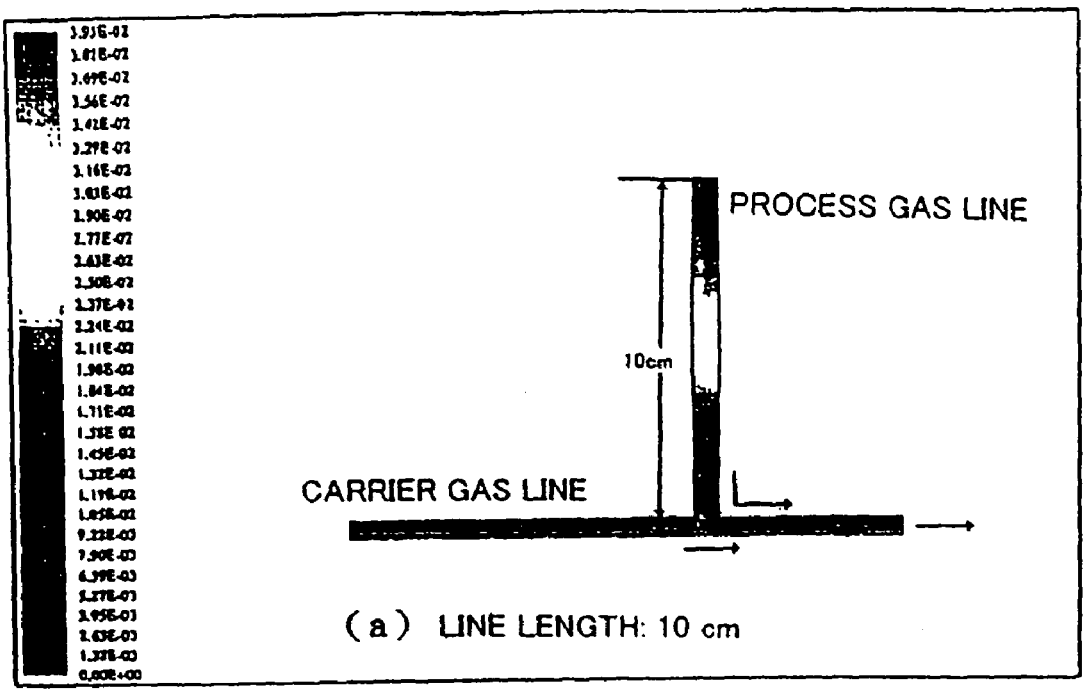
FIG. 9 is a chart showing the results of simulation.
Figure 9:
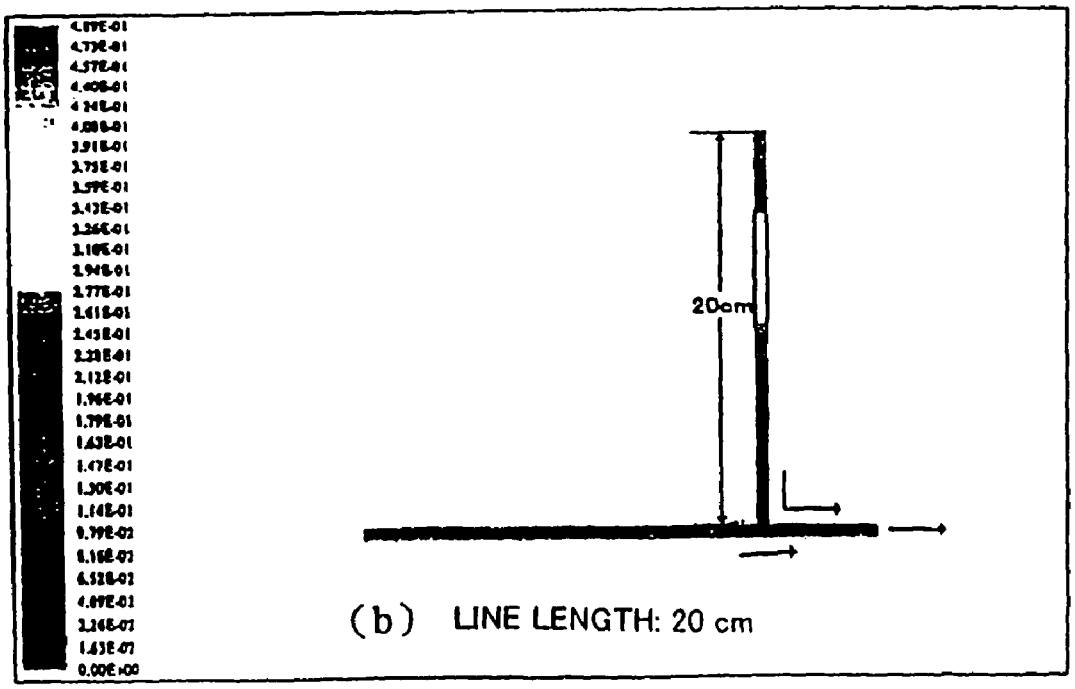
Figure 10:
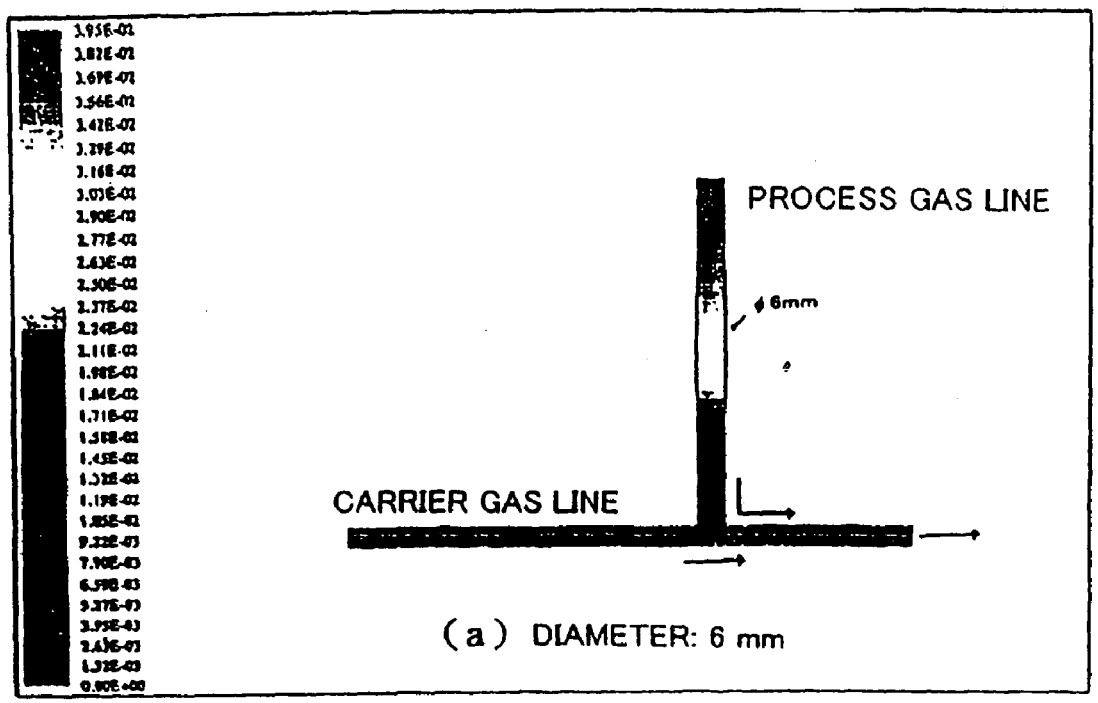
FIG. 10 is a chart showing the results of simulation.
Figure 10:
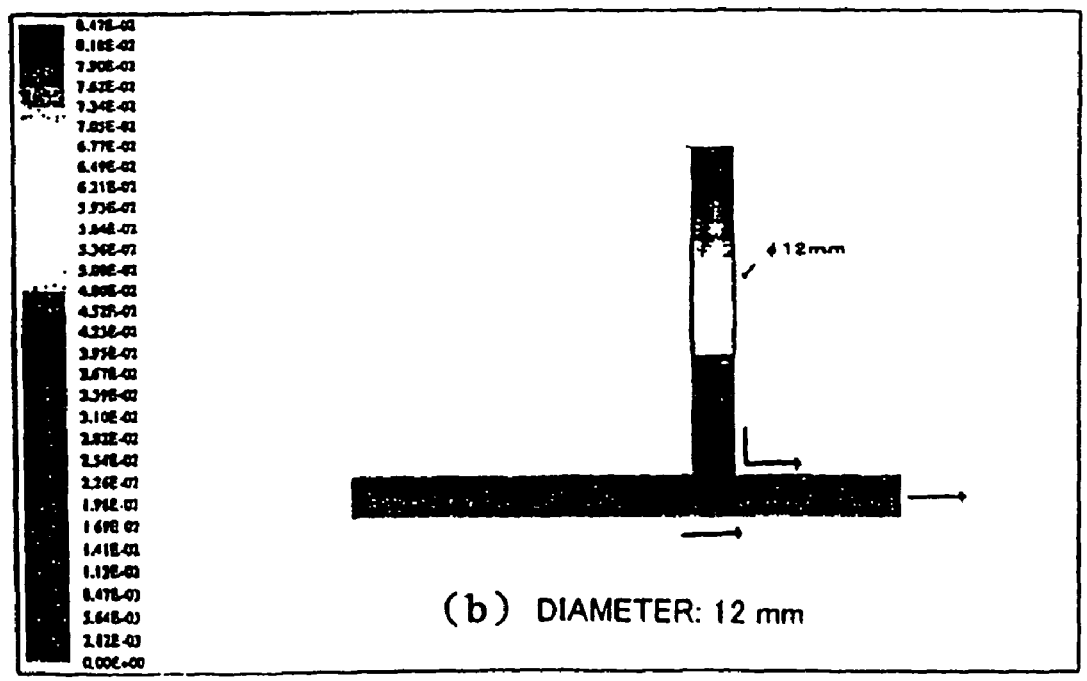

FIGS. 9 and 10 show analysis charts employed in simulation. FIGS. 9(a) and 9(b) show residual process gas concentration distributions when the line length was 10 cm and 20 cm, respectively, and FIGS. 10(a) and 10(b) show residual process gas concentration distributions when the inside diameter was 6 mm and 12 m, respectively. In the actual analysis charts, levels of residual process gas concentration are coded by colors to facilitate the clear recognition of the residual process gas concentration distributions.

Figure 11:
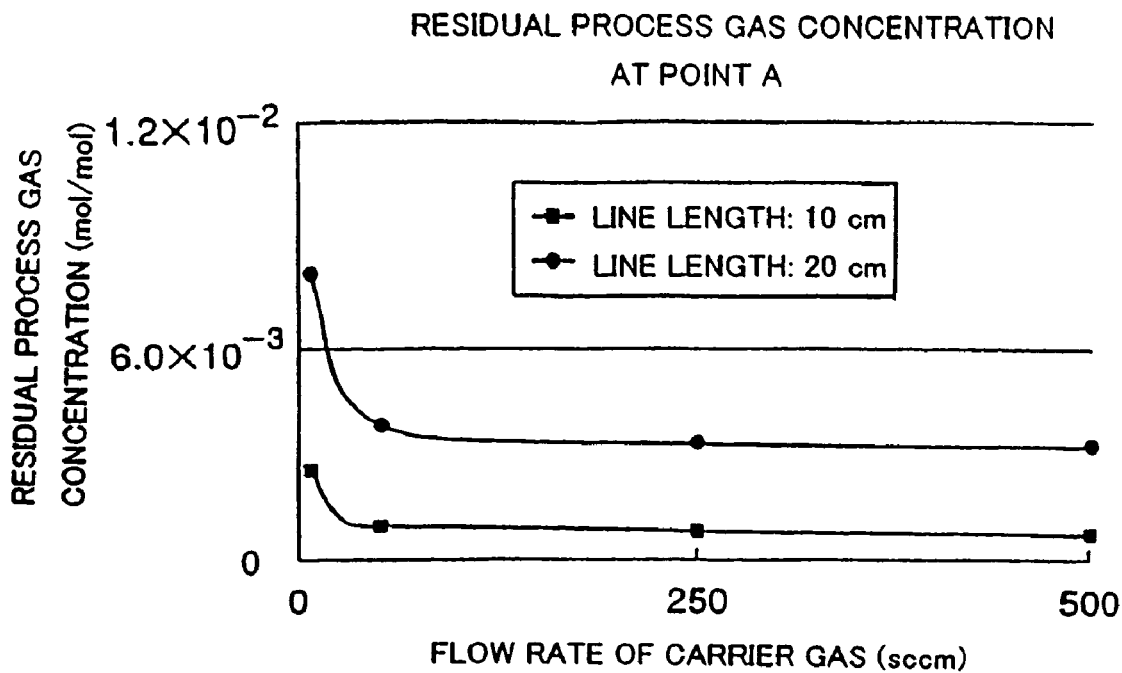
FIG. 11 is a graph showing the dependence of residual process gas concentration at a point A on carrier gas flow rate varied on the basis of the results of simulation for line lengths of 10 cm and 20 cm.
Figure 12:
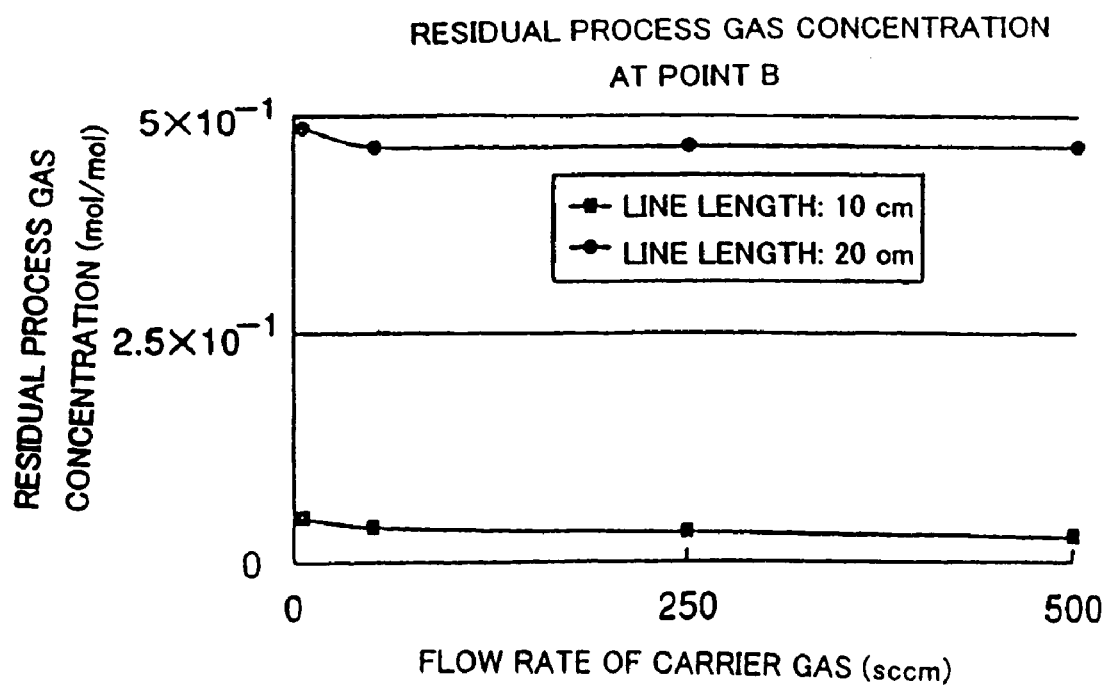
FIG. 12 is a graph showing the dependence of residual process gas concentration at a point B on carrier gas flow rate varied on the basis of the results of simulation for line lengths of 10 cm and 20 cm.
Figure 13:
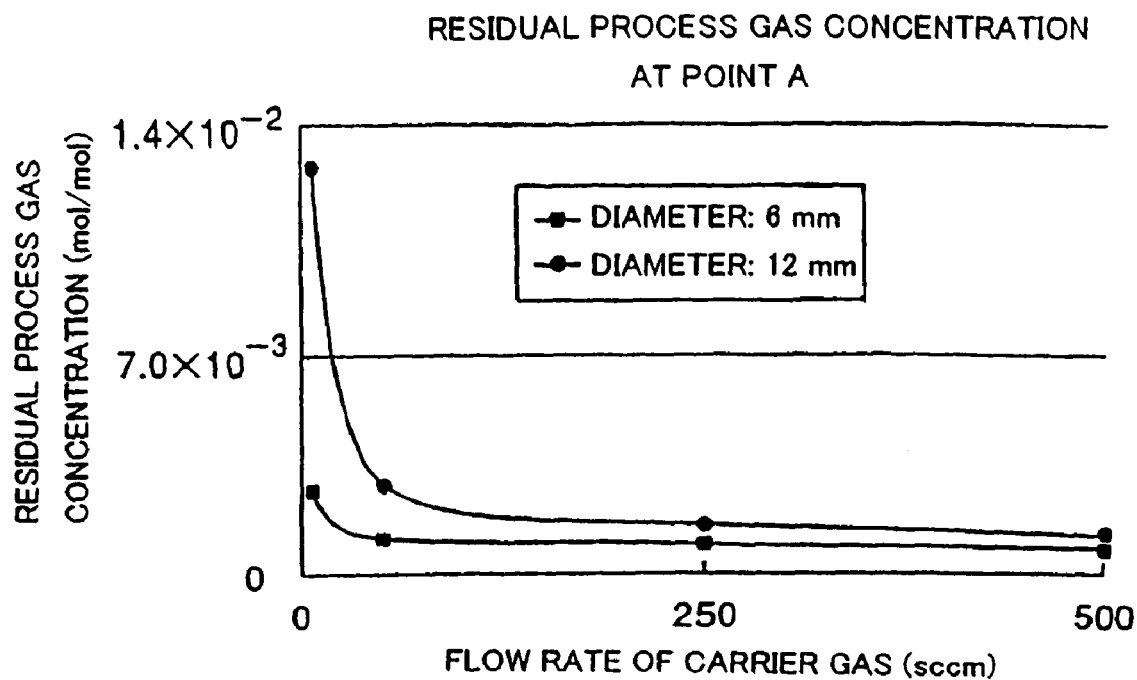
FIG. 13 is a graph showing the dependence of residual process gas concentration at the point A on carrier gas flow rate varied on the basis of the results of simulation for pipe diameters of 6 mm and 12 mm.
Figure 14:
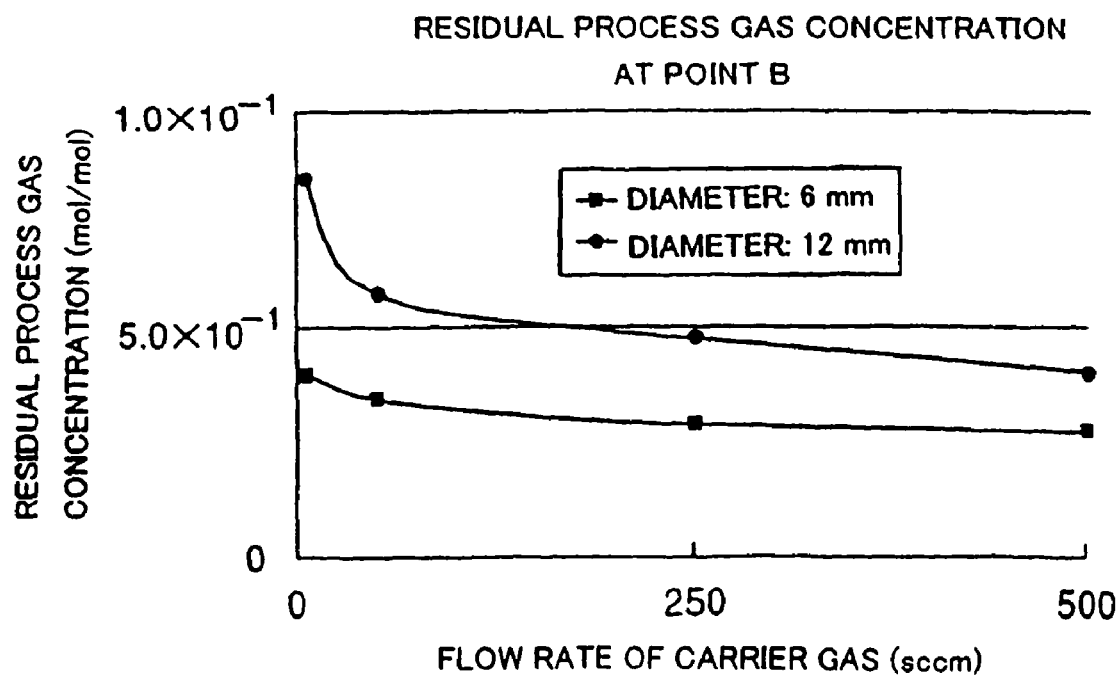
FIG. 14 is a graph showing the dependence of residual process gas concentration at the point B on carrier gas flow rate varied on the basis of the results of simulation for pipe diameters of 6 mm and 12 mm.

FIGS. 11 to 14 show the results of simulation. FIGS. 11 and 12 are graphs showing the dependence of the residual process gas concentrations at the points A and B, respectively, on carrier gas flow rate for line lengths of 10 cm and 20 cm. FIGS. 13 and 14 are graphs showing the dependence of the residual process gas concentrations at the points A and B, respectively, on carrier gas flow rate for inside diameters of 6 mm and 12 mm.

It is known from FIGS. 11 and 12 that the amount of the residual process gas increases in proportion to the line length regardless of the flow rate of the carrier gas.

It is known from FIGS. 13 and 14 that the greater the inside diameter, the greater is the residual process gas concentration, regardless of the flow rate of the carrier gas. The residual process gas concentration is moderately dependent on the flow rate of the carrier gas when the inside diameter was 6 mm and is scarcely dependent on the flow rate of the carrier gas in a region beyond 100 sccm. When the inside diameter is 12 mm, the residual process gas concentration is greatly dependent on the flow rate of the carrier gas in a region where the flow rate of the carrier gas is low.

It is known from those results of simulation that (1) the shorter the line length, the lower is the residual process gas concentration, i.e., the process gas concentration in the process gas line after the valve has been closed, (2) the smaller the inside diameter, the lower is the residual process gas concentration in the process gas line and (3) the residual process gas concentration is not dependent on the flow rate of the carrier gas in a range not lower than 100 sccm when the inside diameter is 6 mm or below and therefore the flow rate of the carrier gas can be optimized.

It may be concluded from the facts (1) and (2) that the shorter the distance between the valve in the process gas line and the joint of the process gas line and the carrier gas line and the smaller the inside diameter of the process gas line, that is, the smaller the inside volume of the process gas line between the valve in the process gas line and the joint of the process gas line and the carrier gas line, the smaller is the residual process gas concentration in the process gas line. It is known from the fact that the higher the residual process gas concentration in the process gas line, i.e., the larger the amount of the process gas remaining in the process gas line, the larger the amount of the process gas that is sucked out from the process gas line by the carrier gas that the amount of the process gas that is sucked out by the carrier gas can be reduced by reducing the distance between the valve placed in the process gas line and the joint of the carrier gas line and the process gas line and reducing the inside diameter of the process gas line. Thus, it is desired to form the process gas line in a length and an inside diameter that reduce the amount of the process gas that flows out from the process gas line after the valve has been closed below a predetermined value that does not affect the film forming process. It is known from the fact (3) that the inside diameter of the process gas line must be 6 mm or below to make the amount of the process gas that flows out from the process gas line after the valve has been closed independent of the flow rate of the carrier gas.

The inside volume of the section of the process gas line between the open-close valve place in the process gas line and the joint of the process gas line and the carrier gas line must be small to reduce the amount of the process gas that flows out from the process gas line after the open-close valve has been closed. Therefore, the integrated valve unit including the plurality of valves is placed in the process gas line so that the valve elements of those valves act directly on the process gas line.

In a conventional integrated valve unit, a gas line extends into the body of each valve section and the valve is opened and closed therein. Therefore, the length of the gas line in the integrated valve unit is long, and the distance between the valve and the joint of the carrier gas line and the process line is long. Consequently, the inside volume of the section of the process gas line between the valve and the joint is large. When the integrated valve unit having the valves having valve elements that act directly on the process gas line is employed, the distance between the valve and the joint of the carrier gas line and the process gas line is very short, so that it is possible to reduce the inside volume of the section of the process gas line between the open-close valve placed in the process gas line and the joint.

In the gas supply system 50, the gases must be changed to supply the purge gas to the process gas line. The purge gas line and the process gas line can be opened and closed by means of the integrated valve units, and either the process gas line or the purge gas line can be selected by operating the integrated valve units. Valves incorporated into the integrated valve units will be described with reference to FIGS. 15 and 16.

A valve shown in FIG. 15 has a valve element 151 and an actuator 154 for turning the valve element 151. A block 131' is provided with two gas lines 152 and 153. The valve element 151 is provided with through holes 151a and 151b in portions thereof respectively corresponding to the gas lines 152 and 153. A groove 151c capable of connecting the gas lines 152 and 153 is formed in the surface of the valve element 151. Suppose that the gas lines 152 and 153 are a purge gas and a process gas line, respectively. In a state shown in FIG. 15(a), the purge gas flows through the purge gas line 152 and the process gas flows through the process gas line 153. In a state shown in FIG. 15(b) where the upper section of the purge gas line 152 is connected to the lower section of the process gas line 153 by the groove 151c, the purge gas can be supplied to the process gas line 153. Supply of both the carrier gas and the process gas can be stopped by placing the valve element 151 at a middle position between the positions shown in FIGS. 15((a) and 15(b). When it is necessary to supply the process gas from the process gas line 153 to the carrier gas line 152, the valve element 151 is turned further to connect the upper section of the process gas line 153 to the lower section of the carrier gas line 152 by the groove 151c.

A valve shown in FIG. 16 has a valve element 161 and an actuator 154 for vertically moving the valve element 161. A block 131" is provided with two gas lines 162 and 163. The valve element 161 is provided with through holes 161a and 161b in portions thereof respectively corresponding to the gas lines 162 and 163. A groove 161c capable of connecting the upper section of the gas line 162 to the lower section of the gas line 163 is formed in the surface of the valve element 161. Suppose that the gas lines 162 and 163 are a purge gas line and a process gas line, respectively. In a state shown in FIG. 16(a), the through holes 161a and 161b are aligned with the gas lines 162 and 163, respectively, and therefore, the carrier gas flows through the carrier gas line 162 and the process gas flows through the process gas line 163. In a state shown in FIG. 16(b) where the upper section of the purge gas line 162 is connected to the lower section of the process gas line 163 by the groove 161c, the purge gas can be supplied to the process gas line 163. Supply of both the carrier gas and the process gas can be stopped by placing the valve element 161 at a middle position between the positions shown in FIGS. 16((a) and 16(b). When it is necessary to supply the process gas from the process gas line 153 to the carrier gas line 152, the valve element 151 may be provided with another groove capable of connecting the upper section of the gas line 163 to the lower section of the process gas line 162 on a level different from that of the groove 161c.

Second Embodiment

A CVD system in a second embodiment according to the present invention will be described with reference to FIGS. 17 to 24.

Figure 17:
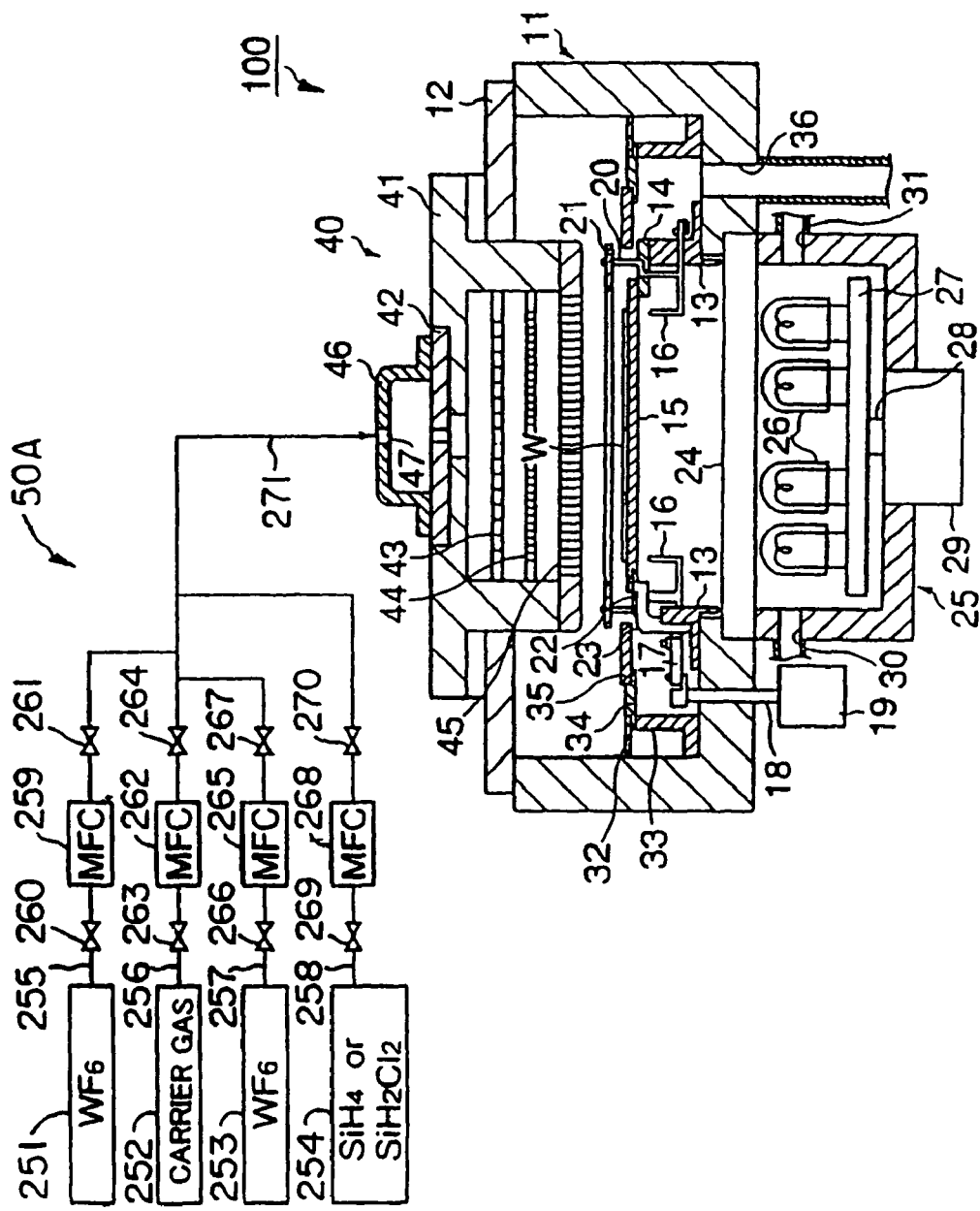
FIG. 17 is a typical sectional view of a CVD system in a second embodiment according to the present invention.

FIG. 17 is a typical sectional view of the CVD system 100A in the second embodiment for forming a WSi film. The CVD system 100A shown in FIG. 17 is the same as the CVD system 100A shown in FIG. 1, except that the CVD system 100A shown in FIG. 17 is provided with a gas supply system 50A instead of the gas supply system 50 shown in FIG. 1. In FIG. 17, parts like or corresponding to those shown in FIG. 1 are denoted by the same reference characters and the description thereof will be omitted to avoid duplication.

The gas supply system 50A includes a first $WF_6$ gas source 251, a carrier gas source 252, a second $WF_6$ gas source 253 and a $SiH_4$ or $SiH_2Cl_2$ gas source 254. A first process gas line 255, a carrier gas line 256, a second process gas line 257 and a third process gas line 258 are connected to the first $WF_6$ gas source 251, the carrier gas source 252, the second $WF_6$ gas source 253 and the $SiH_4$ or $SiH_2Cl_2$ gas source 254, respectively. A open-close valve 260, a mass flow controller 259 and a open-close valve 261 are arranged in that order in the first process gas line 255. A open-close valve 263, a mass flow controller 262 and a open-close valve 264 are arranged in that order in the carrier gas line 256. A open-close valve 266, a mass flow controller 265 and a open-close valve 267 are arranged in that order in the second process gas line 257. A open-close valve 269, a mass flow controller 268 and a open-close valve 270 are arranged in that order in the third process gas line 258. The carrier gas is, for example, Ar gas.

The process gas lines 255, 257 and 258 are joined to the carrier gas line 256. At all the joints of the carrier gas line 256, and the process gas lines 255, 257 and 258, upper and lower sections of the carrier gas line 256 on the opposite sides of the joint extend along a straight line, and sections of the process gas lines 255, 257 and 258 connected to the carrier gas line 256 at the joints are inclined to the carrier gas line 256. The carrier gas line 256 is connected to the gas line 271 connected to the gas inlet port 247.

When forming a WSi film over a surface of a wafer W, a gate valve, not shown, incorporated into the side wall of the vessel 11 is opened, the wafer W is carried through the gate valve into the vessel 11 by a transfer arm, the lifting pins 16 are raised to transfer the wafer W from the transfer arm to the lifting pins 16, the lifting rod 18 is lowered together with the lifting pins 16 to place the wafer W on the wafer table 15.

Subsequently, the interior atmosphere of the vessel 11 is discharged through the exhaust ports 36 to evacuate the vessel 11 to a vacuum in the range of, for example, 0.1 to 80 torr. Then, $WF_6$ gas and $SiH_4$ gas, i.e., the process gases, are supplied by the gas supply system 50A through the shower head 40 into the vessel 11, the halogen lamps 26 placed in the heating vessel 25 are turned on and the turntable 27 are turned to heat the wafer table 15 by heat generated by the halogen lamps 26. Consequently, a WSi film is formed on the wafer W as the result of a predetermined thermochemical gas reaction.

The process gas supply operation of the gas supply system 50A will be described hereinafter.

The carrier gas, such as Ar gas, is supplied from the carrier gas source 252 to the carrier gas line 256, $WF_6$ gas, i.e., a first process gas, is supplied from the first process gas source 251 to the first $WF_6$ gas line 255, strictly controlling the flow rate of $WF_6$ gas by the precision mass flow controller 259 for nucleation. At the same time, $SiH_4$ gas or $SiH_2Cl_2$ gas is supplied from the $SiH_4$ gas or $SiH_2Cl_2$ gas source 254 to the third process gas line 258. The $WF_6$ gas supplied from the first process gas source 251 to the first process gas line 255 and the $SiH_4$ gas or $SiH_2Cl_2$ gas supplied from the third process gas source 254 to the third process gas line 258 flow into the carrier gas line 256 and flow together with the carrier gas through the gas line 271 and the shower head 40 into the vessel 11.

After a predetermined time has passed, the open-close valve 261 of the first process gas line 255 is closed to stop supplying $WF_6$ gas for nucleation from the first $WF_6$ gas source 251, and the open-close valve 267 of the second $WF_6$ gas line 257 connected to the second $WF_6$ gas source 253 is opened to supply $WF_6$ gas through the second process gas line 257 into the carrier gas line 256.

After the open-close valve 261 has been closed, $WF_6$ gas remains in a lower section of the first process gas line 255 below the open-close valve 261 and the residual $WF_6$ gas is sucked out of the lower section of the lower section of the first process gas line 255 by the carrier gas. The amount of $WF_6$ gas that will be sucked out of the lower section of the first process gas line 255 is dependent on the construction of the joint of the first process gas line 255 and the carrier gas line 256. Therefore, unless the construction of the joint is optimized, the amount of the residual process gas sucked out by the carrier gas varies, and thus characteristics of the film vary. The stability of the amount of the residual process gas is dependent on the construction of the joint. In view of such requirements of the joint, joint of the first process gas line 255 and the carrier gas line 256 is formed so that carrier gas line 256 extend straight through the joint and the first process gas line 255 is inclined to the carrier gas line 256 at the joint. In all the other joints, the carrier gas line 256 extends straight through the joint and the process gas line is inclined to the carrier gas line 256.

Although it is desirable that the carrier gas line 256 extends straight through all the joints and the and the process gas lines are inclined to the carrier gas line at the joints, if it is known that only specific one of the joints causes the variation of the process, only the specific joint may be formed in the foregoing construction.

Results of simulation on the basis of which such a conclusion was made will be explained hereinafter.

Figure 18A:
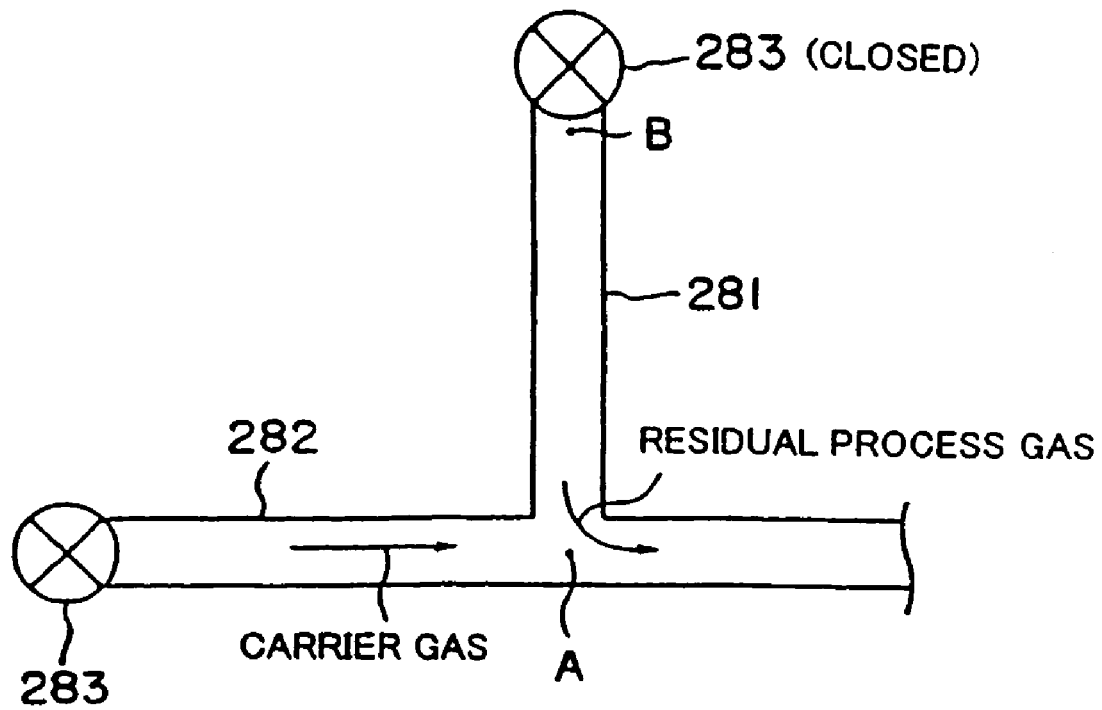
FIG. 18 is a typical view of a gas line of assistance in explaining conditions for simulation relating to the second embodiment.
Figure 18B:
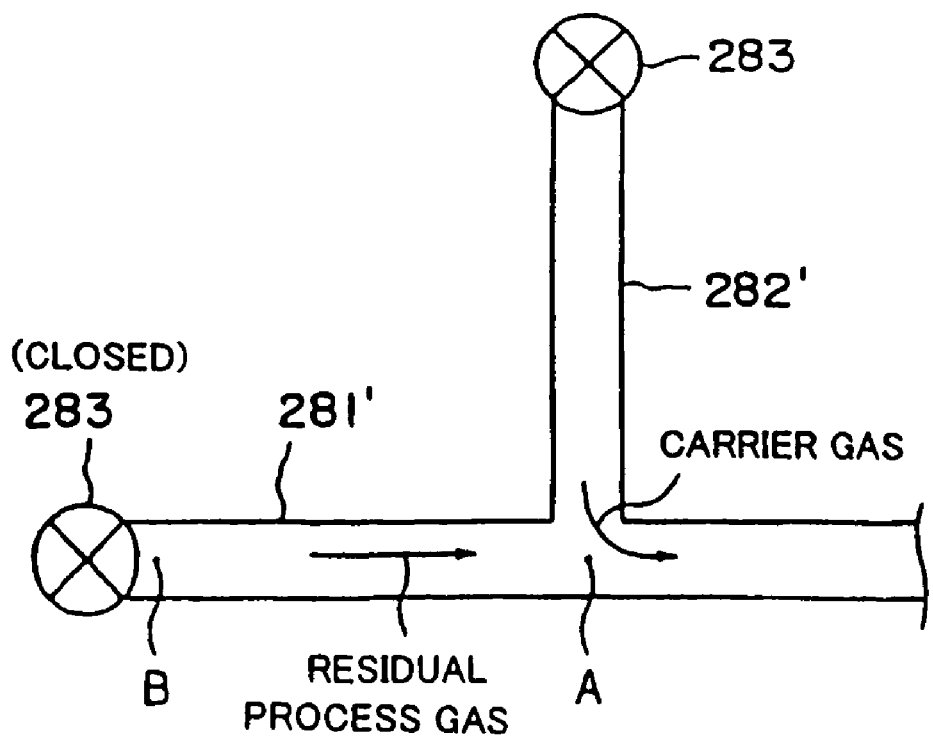

Simulation models of a joint structure shown in FIGS. 18(a) and 18(b) were used for simulation. The simulation model shown in FIG. 18(a) includes a process gas line 281, a carrier gas line 282 and valves 283. The respective lengths of a section of the process gas line 281 below the valve 283 and a section of the carrier gas line 282 below the valve 283 are the same (10 cm or 20 cm). The carrier gas line 282 extends straight through the joint of the carrier gas line 282 and the process gas line 281. The process gas line 281 is inclined to the carrier gas line 282 at the joint. The carrier gas flows through the straight carrier gas line 282. The simulation model shown in FIG. 18(b) includes a process gas line 281', a carrier gas line 282' and valves 283. The respective lengths of a section of the process gas line 281' below the valve 283 and a section of the carrier gas line 282' below the valve 283 are the same (10 cm or 20 cm). The process gas line 281' extends straight through the joint of the carrier gas line 282' and the process gas line 281'. The carrier gas line 282 is inclined to the process gas line 281' at the joint. The process gas flows through the straight process gas line 281' and the carrier gas flows through a curved passage. Parameters for simulation were line length (length of sections of the gas line below the valve): 10 cm and 20 cm, and carrier gas flow rate: 5, 50, 250 and 500 sccm. In the joint structures shown in FIGS. 18(a) and 18(b), the valves 283 of the process gas lines 281 and 281' were closed while the carrier gas was supplied continuously through the carrier gas lines 282 and 282' and residual process gas concentrations at a point B right below the valve 283 and a point A at the joint of the process gas line 281 (281') and the carrier gas line 282 (282') were determined by simulation using "FLUENT", i.e., a general-purpose analysis program.

Figure 19:
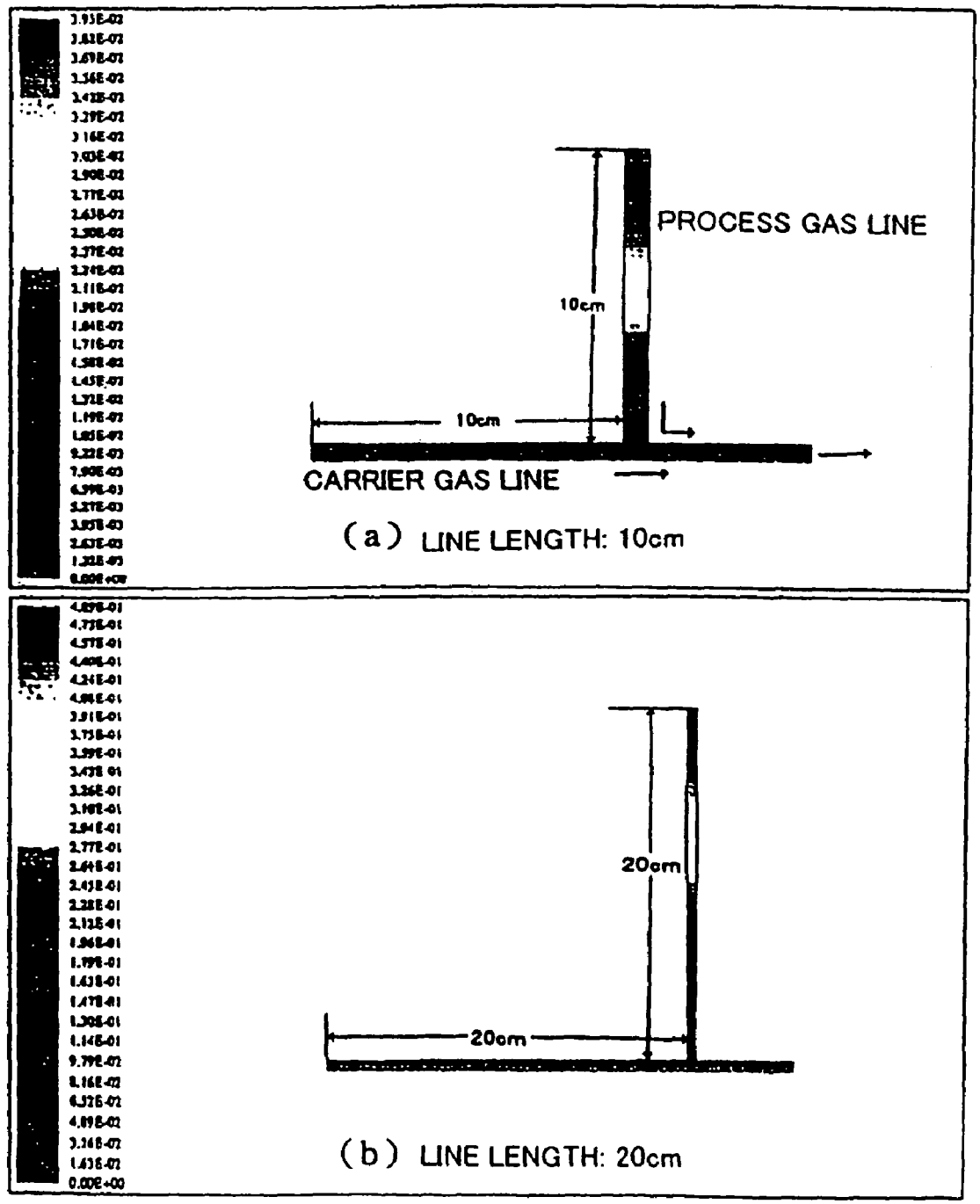
FIG. 19 is a chart showing the results of simulation.
Figure 20:
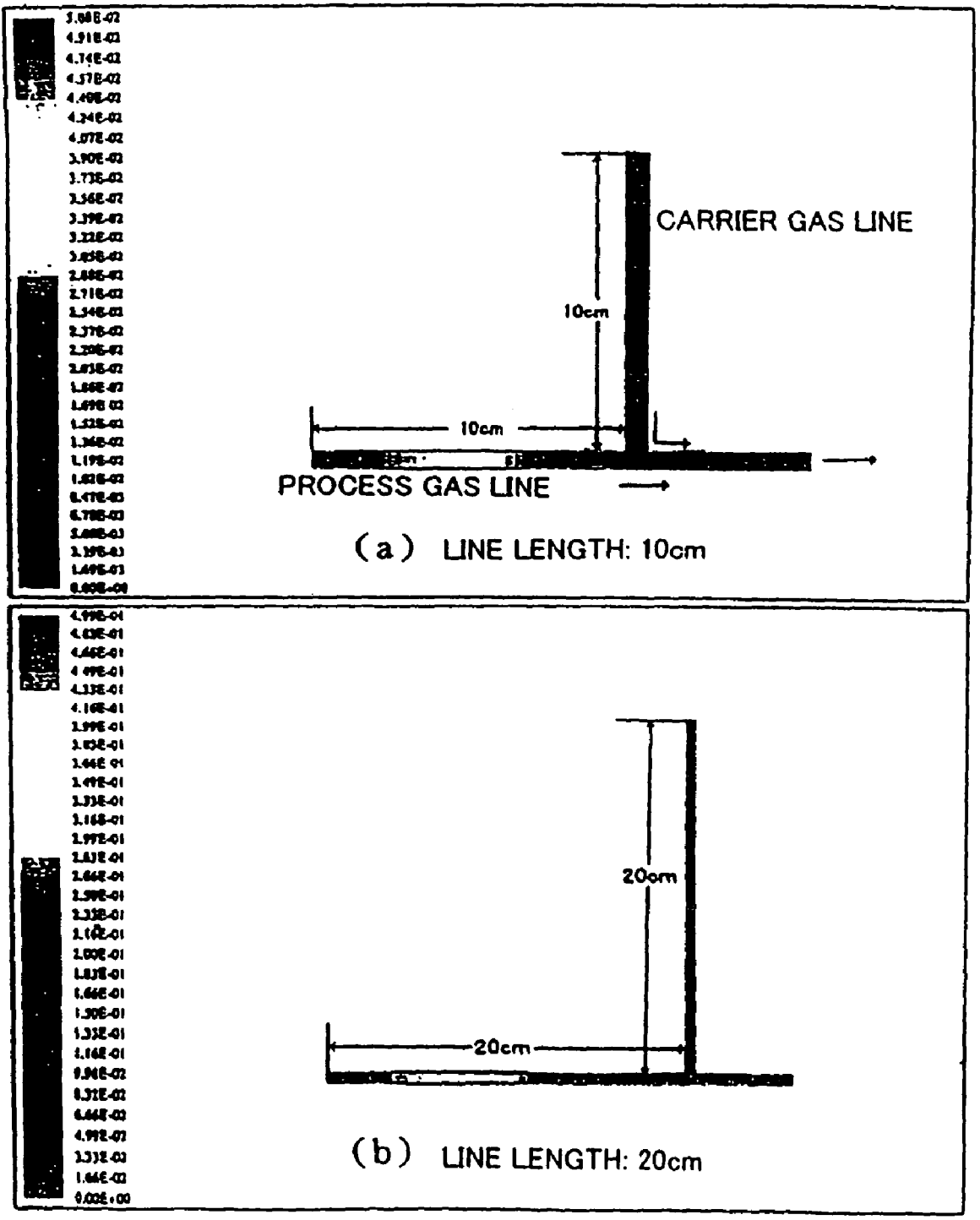
FIG. 20 is a chart showing the results of simulation.

FIGS. 19 and 20 show analysis charts employed in simulation. FIGS. 19(a) and 19(b) show residual process gas concentration distributions in the joint structure shown in FIG. 18(a) when the line length was 20 cm and 20 cm, respectively, and FIGS. 20(a) and 20(b) show residual process gas concentration distributions in the joint structure shown in FIG. 18(b) was used when line length was 10 cm and 20 cm, respectively. In the actual analysis charts, levels of residual process gas concentration are coded by colors to facilitate the clear recognition of the residual process gas concentration distributions.

Figure 21:
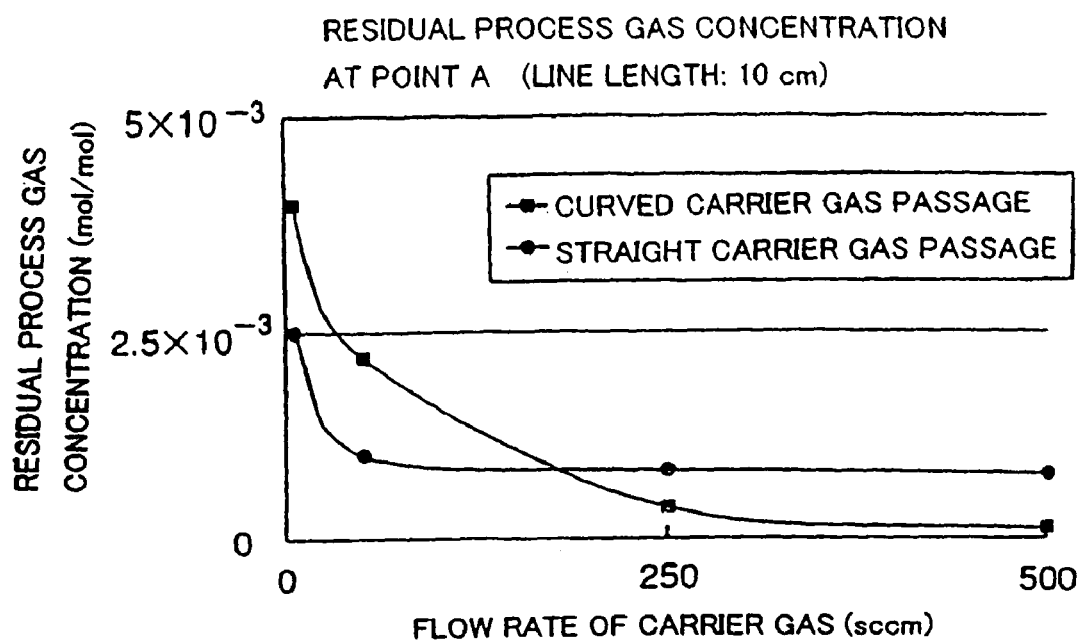
FIG. 21 is a graph showing the dependence of residual process gas concentration at a point A in FIG. 18 on carrier gas flow rate determined on the basis of the results of simulation for a line length of 10 cm.
Figure 22:
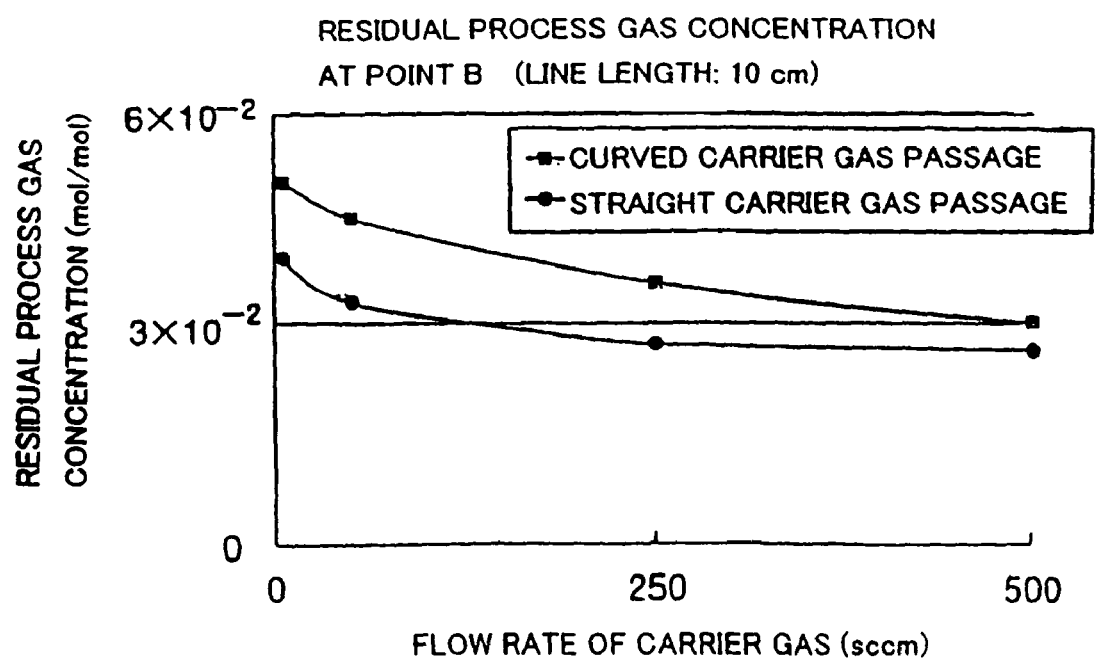
FIG. 22 is a graph showing the dependence of residual process gas concentration at a point B in FIG. 18 on carrier gas flow rate determined on the basis of the results of simulation for a line length of 10 cm.
Figure 23:
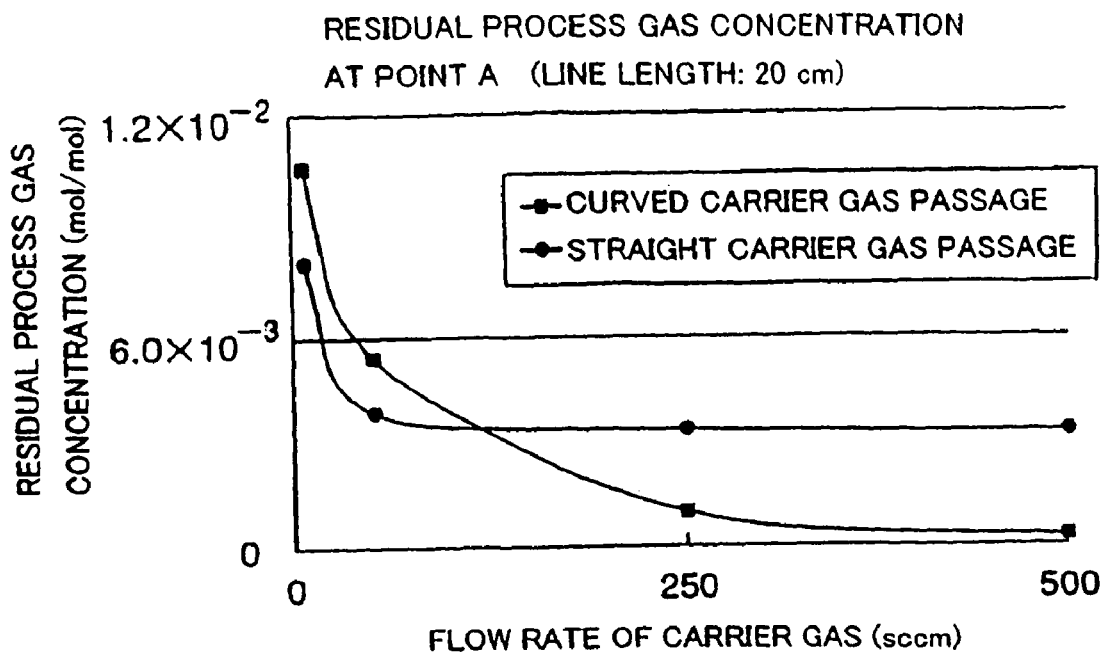
FIG. 23 is a graph showing the dependence of residual process gas concentration at a point A in FIG. 18 on carrier gas flow rate determined on the basis of the results of simulation for a line length of 20 cm.
Figure 24:
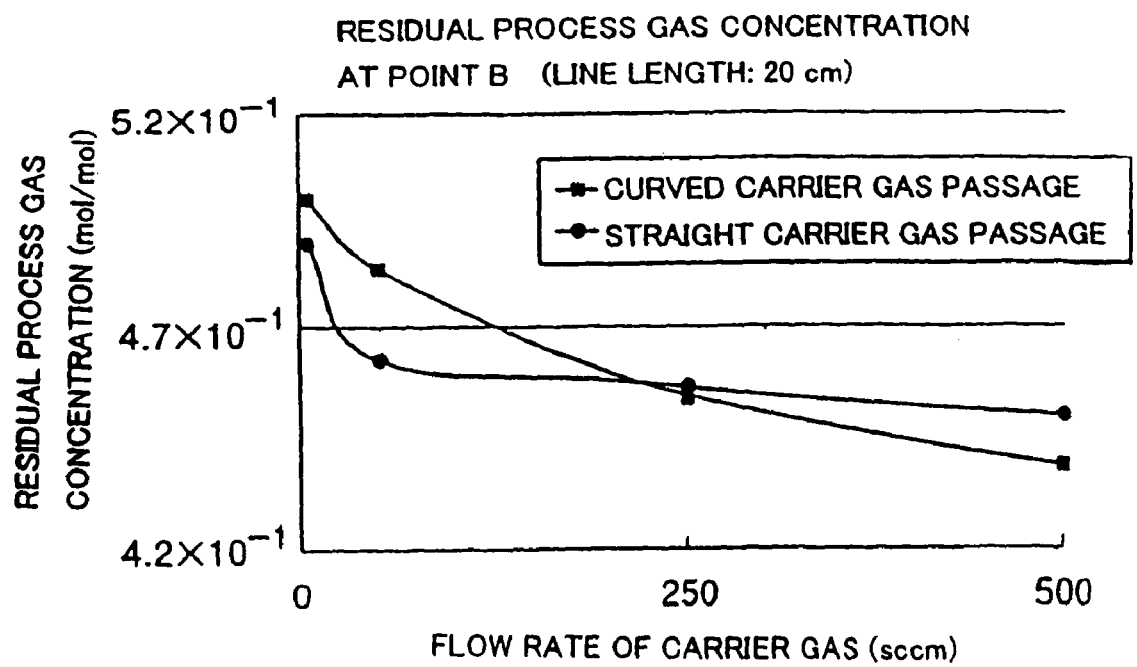
FIG. 24 is a graph showing the dependence of residual process gas concentration at a point B in FIG. 18 on carrier gas flow rate determined on the basis of the results of simulation for a line length of 20 cm.

FIGS. 21 to 24 show the results of simulation representing the dependence of the residual process gas concentration on the flow rate of the carrier gas. FIG. 21 shows the dependence of the residual process gas concentration at the point A on the flow rate of the carrier gas when the line length is 10 cm, FIG. 22 shows the dependence of the residual process gas concentration at the point B on the flow rate of the carrier gas when the line length is 10 cm, FIG. 23 shows the dependence of the residual process gas concentration at the point A on the flow rate of the carrier gas when the line length is 20 cm and FIG. 24 shows the dependence of the residual process gas concentration at the point B on the flow rate of the carrier gas when the line length is 20 cm.

As obvious from FIGS. 21 to 24, mode of dependence of the residual process gas concentration on the flow rate of carrier gas when the carrier gas flows through a straight passage and that when the carrier gas flows along a curved passage are different from each other. It is inferred from this fact that the residual process gas concentration will change, the amount of the process gas that is sucked out by the carrier gas will vary and films of different properties will be formed unless the joint structure of the carrier gas line and the process gas line is optimized. It was proved that the residual process gas concentration is smaller when the carrier gas flows through a curved passage than when the carrier gas flows through a straight passage provided that the carrier gas is supplied at a high flow rate and that the residual process gas concentration is more stable when the carrier gas flows through a straight passage than when the carrier gas flows through a curved passage. When the carrier gas flows through a straight passage at a flow rate of about 100 sccm, the residual process gas concentration remains substantially constant regardless of the flow rate of the carrier gas and the line length. Thus, the residual process gas concentration does not change even if the flow rate of the carrier gas changes if the carrier gas flows through a straight passage and hence the carrier gas can be supplied at an optimum flow rate. Since the residual gas concentration is independent of the line length, design parameters do not need include the line length and a very stable process of a high degree of freedom can be achieved. Although there is no particular restriction on the thickness of films when the present invention is applied to a film forming process, the present invention is particularly effective in forming thin films of a thickness of about 100 nm or below. The foregoing line arrangement according to the present invention is effective in forming thin films, such as nucleation films.

Figure 25:
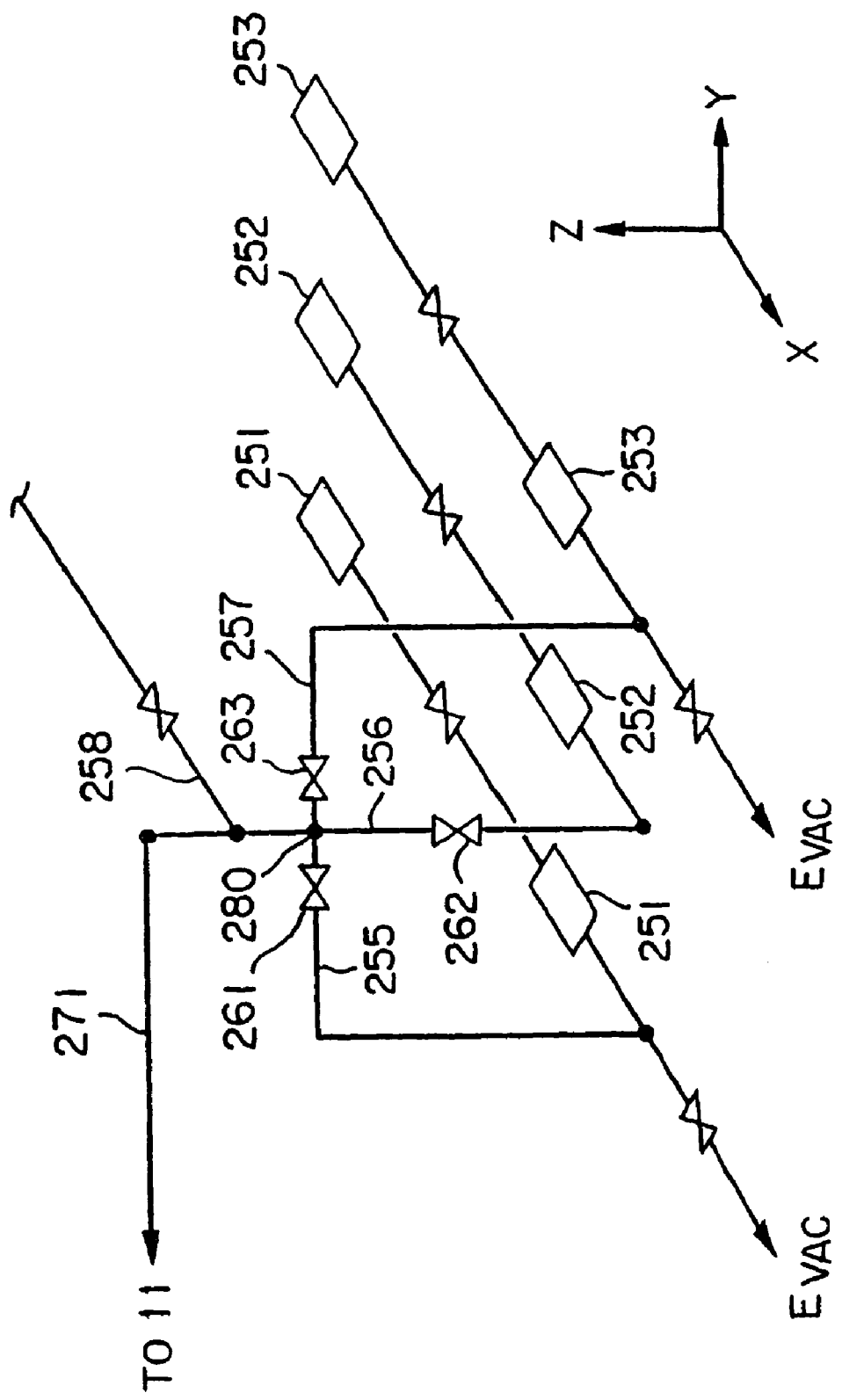
FIG. 25 is a diagrammatic view showing the three-dimensional arrangement of the components of a gas supply system shown in FIG. 17.

FIG. 25 shows the three-dimensional arrangement of the gas supply system 50A shown in FIG. 17. As shown in FIG. 25, the first process gas line 255, the carrier gas line 256 and the second process gas line 257 are joined at a single joint 280, and the gas line 271 connected to the vessel 11 is connected to the joint 280. Sections of the process gas lines 255 and 257 connected to the joint 280 are extended in parallel to the Y-axis, and sections of the carrier gas line 256 and the gas line 271 connected to the joint 280 are extended in parallel to the Z-axis. The open-close valves 261 and 263 are disposed close to the joint 280.

Third Embodiment

A CVD system in a third embodiment according to the present invention will be described with reference to FIGS. 26 to 31. The third embodiment is intended to optimize the type and the flow rate of a carrier gas.

Referring to FIG. 26 typically showing a joint structure, a process gas line 381 and a carrier gas line 382 are joined together to mix a process gas and a carrier gas. When a valve 383 placed in the process gas line 381 is closed, the process gas remaining in a section of the process gas line 381 between the valve 383 and the joint of the process gas line 381 and the carrier gas line 382 flows downstream together with the carrier gas. Inventors of the present invention made studies and found that the residual process gas flows downstream together with the carrier gas due to interdiffusion between the process gas and the carrier gas and its degree is dependent on diffusion coefficient. That is, the greater the diffusion coefficient, the higher is the effect of the carrier gas on entraining the residual process gas. Since the smaller the respective molecular weights of the carrier gas and the process gas, the greater is the diffusion coefficient, a carrier gas having a smaller molecular weight has a higher effect on entraining the residual process gas. Any studies have not been made concerning the effect of the molecular weight of the carrier gas. Ar gas, which has been widely used as a carrier gas, has a relatively large molecular weight of 39.948. Therefore, the process gas is liable to remain in the process gas line when Ar gas is used as a carrier gas. It is possible to reduce the amount of the residual process gas by using a process gas having a molecular weight of 30 or below.

It is desirable that the process gas concentration of a mixed gas in the section of the process gas line below the valve 383 is 1% or below at any point in the section of the process gas line below the valve 383 after the valve 383 has been closed to stop supplying the process gas. If the process gas concentration is on such a low level, the residual process gas does not affect adversely to the process.

Preferably, the flow rate of the carrier gas is 100 sccm or above. The residual process gas concentration can be kept substantially constant regardless of the flow rate of the carrier gas when the flow rate of the carrier gas is 100 sccm or above.

Results of simulation on the basis of which such a conclusion was made will be described hereinafter.

Figure 27:
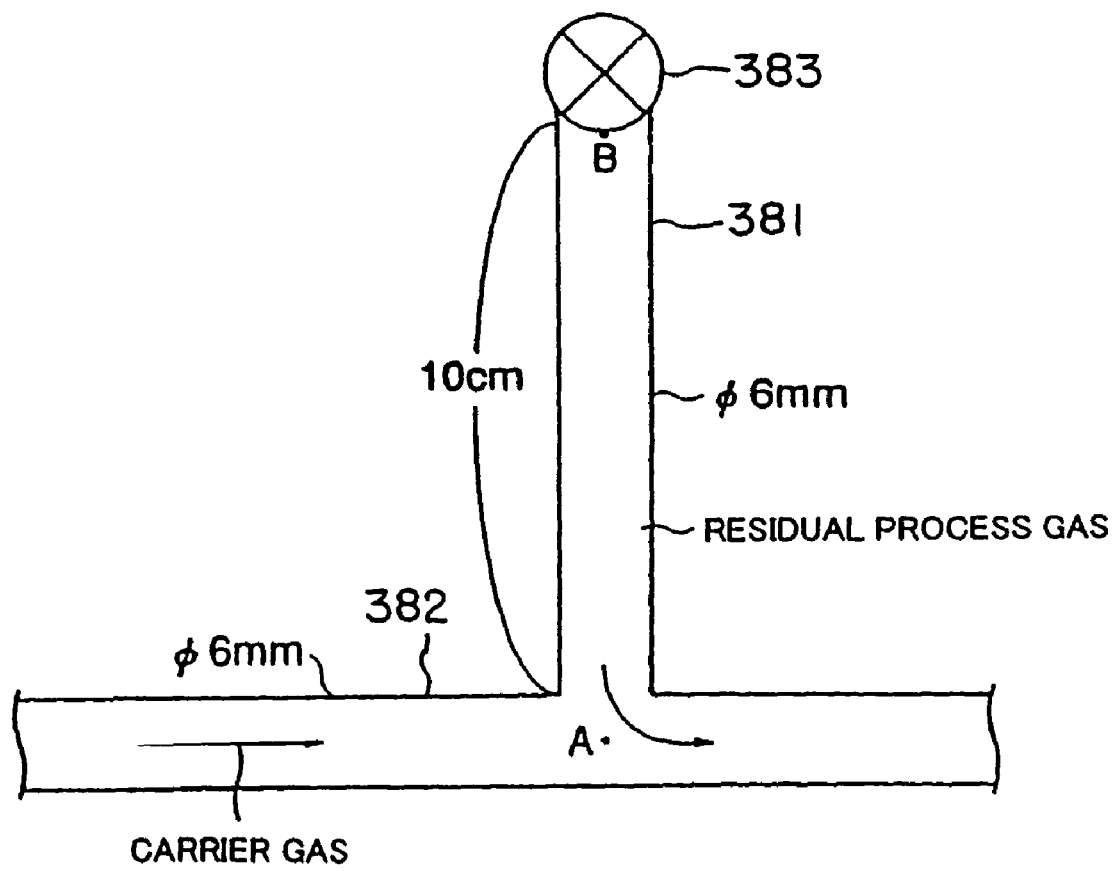
FIG. 27 is a typical view of a gas line of assistance in explaining conditions for simulation relating to the third embodiment.

A joint structure shown in FIG. 27 was used for simulation. A process gas line 381 and a carrier gas line 382 were pipes having an inside diameter of 6 mm. The length of an end section of the process gas line 381 below a valve 382 was 10 cm. It was supposed that the process gas remained in the end section of the process gas line 381 after the valve 383 had been closed.

Parameters for simulation were carrier gas: Ar gas and He gas, process gas: $WF_6$ gas and $SiH_4$ gas, and flow rate of carrier gas: 5, 50, 250 and 500 sccm. Residual process gas concentrations at a point B right under the valve 383 and at a point A corresponding to the center of the joint of the process gas line 381 and the carrier gas line 382 were determined by simulation using "FLUENT", i.e., a general-purpose analysis program.

Figure 28:
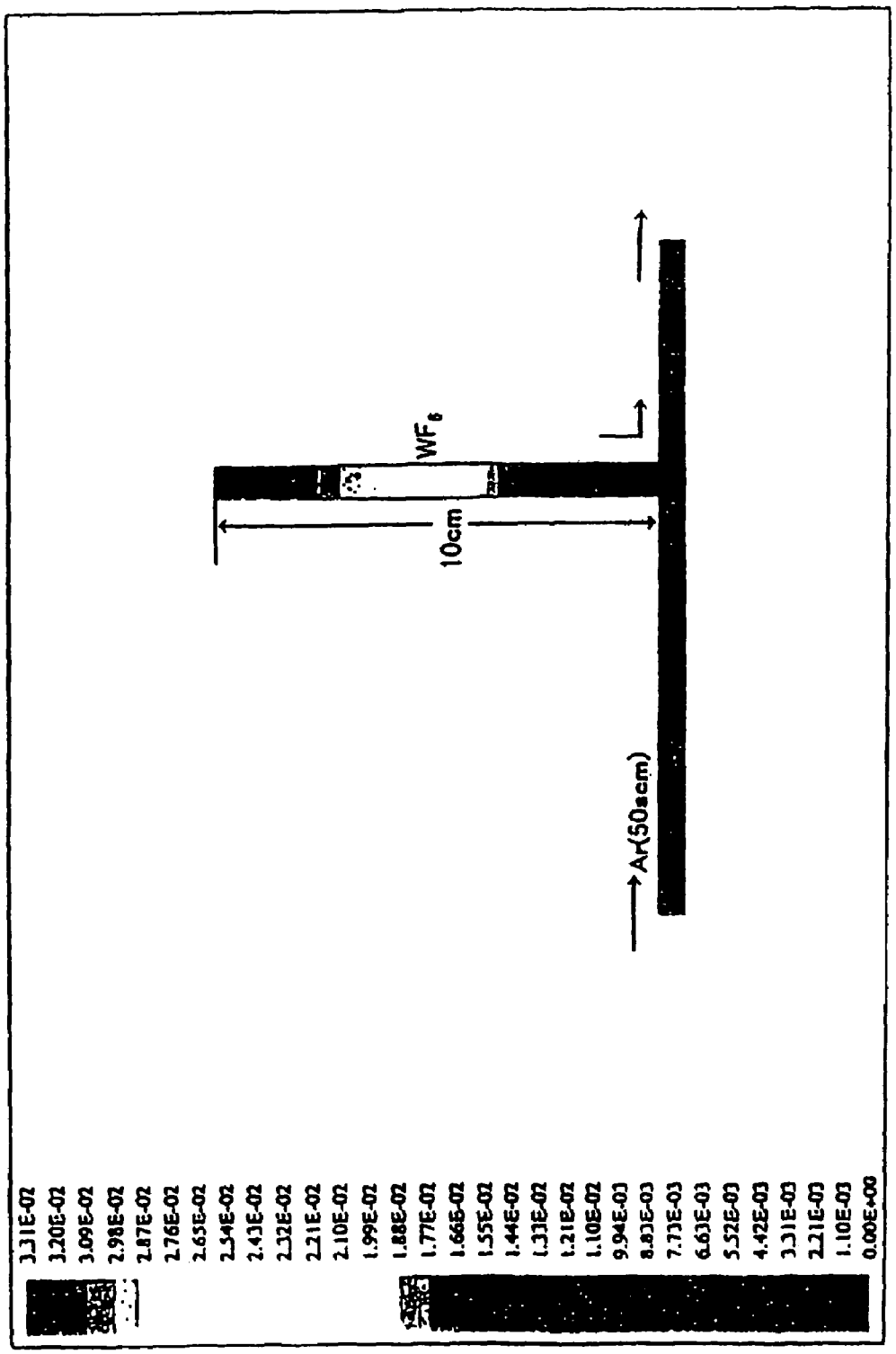
FIG. 28 is a chart showing the results of simulation.

FIG. 28 shows an analysis chart employed in simulation. In the actual analysis chart, levels of residual process gas concentration are coded by colors to facilitate the clear recognition of the residual process gas concentration distributions.

Figure 30:
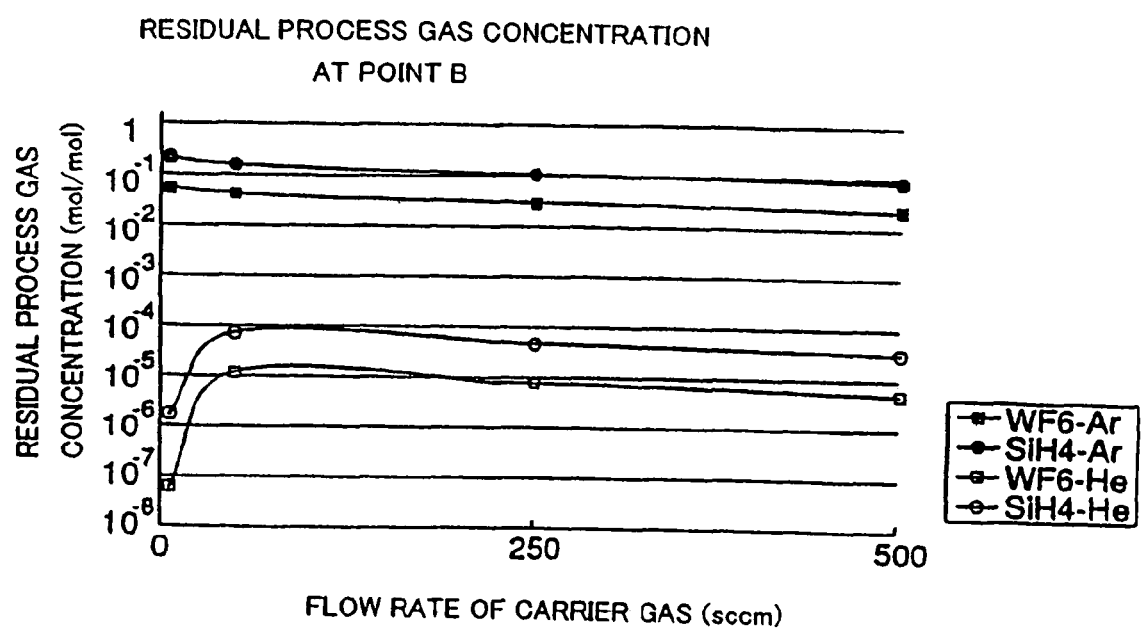
FIG. 30 is a graph showing the dependence of residual process gas concentration at a point B in FIG. 27 on carrier gas flow rate determined on the basis of the results of simulation.

FIGS. 29 and 30 are graphs showing the dependence of the residual process gas concentrations at the points A and B in a steady state, respectively, on carrier gas flow rate. It is known from FIGS. 29 and 30 that the residual process gas concentration at either the point A or B when He gas is used as a carrier gas is about three decimal places smaller than that when Ar gas is used as a carrier gas.

It was known from the actual chart shown in FIG. 28 that the residual process gas mixes with the carrier gas and flows downstream together with the carrier gas due to interdiffusion between the process gas and the carrier gas. When interdiffusion between the carrier gas and the process gas is the principal cause of the mixing of the process gas with the carrier gas and the downstream flow of the same together with the carrier gas, the degree is dependent on diffusion coefficient; that is, the greater the diffusion coefficient, the higher is the effect of the carrier gas on entraining the residual process gas.

The diffusion coefficient $D_{CP}$ can be expressed by Expression (1).

$$D_{CP} = 0.1883 \times 10^{-7} \frac{\{T^3(1/M_C + 1/M_P)\}^{1/2}}{P\sigma_{CP}^2 \cdot \Omega_{D_{CP}}} \quad (1)$$

where $M_C$ denotes the molecular weight of the carrier gas, $M_P$ denotes the molecular weight of the process gas, T denotes the temperature (K) of the system, P denotes the pressure (Pa) of the system, $\sigma_{CP}$ is the size parameter (A) of a Lenard-Jones potential model and $\Omega_{D_{CP}}$ is collision integral dependent on collision between a gas 1 (carrier gas (component C)) and a gas 2 (process gas (component P)).

Mean size parameter $\sigma_{CP}$ and mean energy parameter $\epsilon_{CP}/\kappa$ are expressed by Expressions (2) and (3).

$$\sigma_{CP} = (\sigma_C + \sigma_P)/2 \quad (2)$$

$$\epsilon_{CP}/\kappa = (\epsilon_C \cdot \epsilon_P)^{1/2}/\kappa \quad (3)$$

Reduced temperature $T_N$ for temperature T to determine a coefficient from $\epsilon_{CP}/\kappa$ is expressed by Expression (4).

$$T_N = T/(\epsilon_{CP}/\kappa) \quad (4)$$

Collision integral $\Omega_{D_{CP}}$ is expressed by Expression (5) using $T_N$.

$$\Omega_{D_{CP}} = \frac{1.06036}{T_N^{0.1561}} + \frac{0.19300}{\exp(0.47635 T_N)} + \frac{1.03587}{\exp(1.52996 T_N)} + \frac{1.76474}{\exp(3.89411 T_N)} \quad (5)$$

It is known from Expression (1) that the smaller the molecular weight of the gas, the greater is the diffusion coefficient $D_{CP}$. Since the greater the diffusion coefficient, the greater is the effect of the carrier gas on entraining the residual process gas as mentioned above, the smaller the molecular weight of the carrier gas, the greater is the amount of the process gas that is flows out of the process gas line and the less is the amount of the residual gas.

Molecular weights of Ar gas, He gas, $WF_6$ gas and $SiH_4$ gas are tabulated in Table 1 and diffusion coefficients $D_{CP}$ of combinations of those gases are tabulated in Table 2.

TABLE 1

| Gas | $WF_6$ | $SiH_4$ | Ar | He |
|---|---|---|---|---|
| Mol. wt. | 297.84 | 32.117 | 39.948 | 4.0026 |

TABLE 2

| Gases | $WF_6$—Ar | $SiH_4$—Ar | $WF_6$—He | $SiH_4$—He |
|---|---|---|---|---|
| $D_{CP}(m^2/s)$ | $5.5786 \times 10^{-6}$ | $1.1232 \times 10^{-4}$ | $2.9632 \times 10^{-4}$ | $4.4181 \times 10^{-4}$ |

As shown in Table 1, the molecular weight of He gas is about 1/10 of that of Ar gas and hence the diffusion coefficient is large when He gas is used. $D_{CP}=5.5786 \times 10^{-5}$ for the combination of $WF_6$ gas and Ar gas and $D_{CP}=2.9632 \times 10^4$, which is f5.31 times the former, for the combination of $WF_6$ and He gas, which signifies that the effect of He gas on entraining the residual process gas is higher than that of Ar gas.

The results of simulation shown in FIGS. 29 and 30 demonstrate the respective residual process gas entraining effects of Ar gas and He gas. As mentioned above, the residual process gas concentration at either the point A or B when He gas is used as a carrier gas is about three decimal places smaller than that when Ar gas is used as a carrier gas. This tendency is true with both a case where the process gas is $WF_6$ gas and a case where the process gas is $SiH_4$ gas; that is, this tendency is independent of the type of the process gas. The residual process gas concentration is substantially constant when the flow rate of the carrier gas is about 100 sccm or above; that is, the residual process gas concentration is independent of the flow rate of the carrier gas not lower than about 100 sccm. Thus, the process is stable when the flow rate of the carrier gas is about 100 sccm or above.

It is preferable that the process gas concentration of a mixed gas in the section of the process gas line below the valve is 1% or below at any point in the section of the process gas line below the valve after the valve has been closed to stop supplying the process gas in view of preventing the adverse effect of the residual process gas on the process. It is known from FIGS. 29 and 30 that the residual process gas concentrations at the points A and B are far lower than the preferable upper limit of the residual process gas concentration when He gas is used as the carrier gas. When Ar gas is used as the carrier gas, the residual process concentration at the point B is greater than 1%, which teaches that Ar gas is not a desirable carrier gas. Thus, it is preferable to use a gas that provides a diffusion coefficient higher than that provided by Ar gas and having a molecular weight smaller than that of Ar gas as the carrier gas. Simulation using $WF_6$ gas as the process gas and He gas as the carrier gas and a process gas line having a 10 cm long section below the valve showed that a point where the residual process gas concentration is 1% was 94.6 m above the joint of the process gas line and the carrier gas line; that is the section of the process gas line below the valve must be very long to create a point where the residual process gas concentration is 1%.

Figure 31:
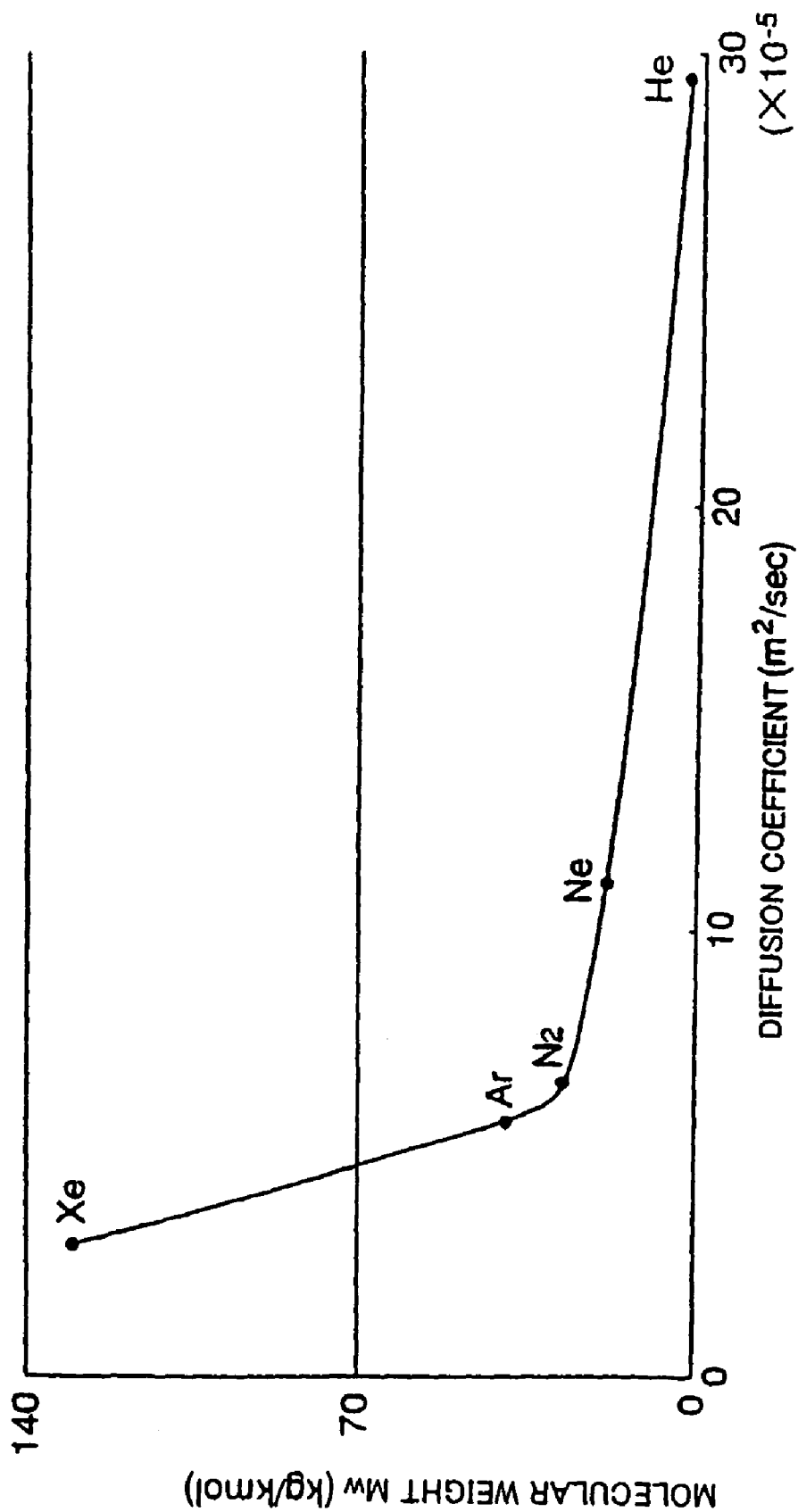
FIG. 31 is a graph showing the relation between diffusion coefficient and molecular weight.

FIG. 31 is a graph showing the relation between diffusion coefficient and the molecular weight of the carrier gas when $WF_6$ gas is used as the process gas in combination with different inert gases. As shown in FIG. 31, $N_2$ gas and Ne gas, as well as He gas, have molecular weights smaller than that of Ar gas and provide a large diffusion coefficient. It is expected that when any one of those inert gases other than Ar gas is used, the residual process gas concentration in the section of the process gas line below the valve after the valve has been closed can be reduced to a level lower than that of the residual process gas concentration when Ar gas is used as the carrier gas and the residual process gas concentration at any point in the section of the process gas line below the valve can be reduced to about 1% or below. Since the molecular weight of $N_2$ gas is about 28, the present invention requires that the molecular weight of the carrier gas be 30 or below.

Possible gases meeting the requirement of the carrier gas are He gas, Ne gas and $N_2$ gas. Since the smaller the molecular weight, the higher the effect on entraining the residual process gas, He gas is the most preferable carrier gas.

Possible carrier gases other than inert gases, such as He gas, are inorganic gases including $NH_3$ gas, $N_2O$ gas and NO gas, and organic gases that serve also as the process gas including gases of organic solvents.

The features of the first, the second and the third embodiment can be used in optional combinations, and the combinations of those features exercise effects more excellent than those exercised by individual features. When the features of the third embodiment is not employed, optional gases may be used as the carrier gas. For example, an organic gas produced by gasifying or evaporating an organic solvent and capable of partly serving as the process gas may be used.

Although the invention has been described as applied to CVD systems for forming WSi films, the present invention is applicable to the formation of films of other materials, such as W, Ti, TiN and such by CVD and to processes using gases other than CVD processes. The substrate is not limited to a wafer and may be a substrate of any kind.

What is claimed is:

1. A gas processing apparatus comprising:
a processing vessel adapted to contain a substrate therein;
an integrated valve device providing at least one gas line each for supplying a gas into the processing vessel, the integrated valve device including a plurality of blocks each having a gas passageway formed therethrough, the plurality of blocks including at least one valve block each provided therein with a valve element to control flow of the gas passing through the gas passage in the valve block; and
an evacuating device for evacuating an interior of the processing vessel, wherein
the plurality of blocks include first and second blocks and a joint block interposed between the first and second blocks to connect the first and second blocks to each other, the first block, the joint block and the second block are aligned in a row in that order to form a block array extending in a first direction, the gas passages of the first block, the joint block and the second block are connected to form a continuous gas passage, one of the first block and the joint block has a recess and the other of the first block and the joint block has a projection fitted into the recess, and one of the second block and the joint block has a recess and the other of the second block and the joint block has a projection fitted into the recess, and the continuous gas passage passes through the projections, a first washer is sandwiched between the projection and the recess at a first joint between the first block and the joint block and a second washer is sandwiched between the projection and the recess at a second joint between the second block and the joint block, and the first washer is crushed by a pressure generated due to a first connecting force between the first block and the joint block to form a metal seal between the projection and the recess at the first joint, and the second washer is crushed by a pressure due to a second connecting force between the second block and the joint block to form a metal seal between the projection and the recess at the second joint, and the joint block has a first through-hole allowing insertion of a first screw bolt and a first recessed portion providing a first clearance allowing operation of a head of the first screw bolt, the joint block has a second through-hole allowing insertion of a second screw bolt and a second recessed portion providing a second clearance allowing operation of a head of the second screw bolt, the first screw bolt extends in the first direction and is in thread engagement with a first threaded hole formed in the first block to generate the first connecting force, and the second screw bolt extends in the first direction and is in thread engagement with a second threaded hole formed in the second block to generate the second connecting force.

2. The gas processing apparatus according to claim 1, wherein the plurality of blocks includes:
a first set of blocks connected in series and providing at least a part of a first process gas line, as said at least one gas line, connecting a first process gas source to the processing vessel to supply a first process gas into the processing vessel; and
a second set of blocks connected in series and providing, at least a part of a carrier gas line, as said at least one gas line, connecting a carrier gas source to the processing vessel to supply a carrier gas into the processing vessel.

3. The gas processing apparatus according to claim 2, wherein:
the first process gas line merges into the carrier gas line at a junction;
the first set of block contains a shutoff valve block, as said at least one valve block, which has a function of a shutoff valve;
the shutoff valve block is arranged in the first process gas line at a position upstream of the junction; and
wherein an axis of the carrier gas line extends straightly at least in an area from a position upstream of the junction to a position downstream of the first junction without having any curved or bent portion in the area and the first process gas line intersects the carrier gas line at an angle at the junction.

4. The gas processing apparatus according to claim 3, wherein the shutoff valve block comprises:
a valve block body provided with a valve bore and into which the gas passage opens;
a valve element movably fitted into the valve bore of the valve block body; and
an actuator that drives the valve element.

5. The gas processing apparatus according to claim 3, wherein the first set of the blocks includes a mass-flow controller block provided with a mass-flow controller and disposed upstream of the shutoff-valve block.

6. The gas processing apparatus according to claim 2, wherein the plurality of block includes:
a third set of blocks connected in series and providing at least a part of a second process gas line, as said at least one gas line, connecting a second process gas source to the processing vessel to supply a second process gas into the processing vessel.

7. The gas processing apparatus according to claim 2, wherein the plurality of blocks includes:
a fourth set of blocks connected in series and providing at least a part of a cleaning gas line, as said at least one gas line, connecting a cleaning gas source to the processing vessel to supply a cleaning gas into the processing vessel.

8. The gas processing apparatus according to claim 2, wherein at least one of the first set of blocks and the second set of blocks includes the block array having the first and second blocks and the joint block.

9. The gas processing apparatus according to claim 1, wherein the first block is provided with a first flow control device, the second block is provided with a second flow control device, and the joint block is not provided with a flow control device.

10. The gas processing apparatus according to claim 9, wherein each of the first and second flow control devices are selected from a group consisting of a valve, a mass-flow controller and a filter.

* * * * *